US009288066B2

(12) United States Patent
Hui et al.

(10) Patent No.: US 9,288,066 B2
(45) Date of Patent: Mar. 15, 2016

(54) DYNAMIC MULTICAST MODE SELECTION IN A COMMUNICATION NETWORK

(75) Inventors: Jonathan W. Hui, Foster City, CA (US); Jean-Philippe Vasseur, Saint Martin d'Uriage (FR)

(73) Assignee: Cisco Technology, Inc., San Jose, CA (US)

( * ) Notice: Subject to any disclaimer, the term of this patent is extended or adjusted under 35 U.S.C. 154(b) by 1161 days.

(21) Appl. No.: 13/293,871

(22) Filed: Nov. 10, 2011

(65) Prior Publication Data

US 2013/0121335 A1    May 16, 2013

(51) Int. Cl.
*H04L 12/28* (2006.01)
*H04L 12/18* (2006.01)
*H04L 12/751* (2013.01)
*H04L 12/721* (2013.01)
*H04L 12/761* (2013.01)
*H04J 1/16* (2006.01)

(52) U.S. Cl.
CPC .............. *H04L 12/18* (2013.01); *H04L 45/02* (2013.01); *H04L 45/14* (2013.01); *H04L 45/16* (2013.01)

(58) Field of Classification Search
USPC ......................................... 370/252, 230, 390
See application file for complete search history.

(56) References Cited

U.S. PATENT DOCUMENTS

| 6,847,638 | B1 | 1/2005 | Wu et al. |
| 7,443,858 | B1 | 10/2008 | Cheriton et al. |
| 7,969,980 | B1 | 6/2011 | Florit et al. |
| 9,019,981 | B1 * | 4/2015 | Weinstein et al. ............ 370/432 |
| 2004/0170188 | A1 * | 9/2004 | Paila ...................... H04L 12/185 370/432 |
| 2006/0159091 | A1 | 7/2006 | Boers et al. |
| 2006/0182121 | A1 | 8/2006 | Kounin et al. |
| 2007/0091827 | A1 | 4/2007 | Boers et al. |
| 2007/0091890 | A1 | 4/2007 | Radhakrishnan et al. |
| 2009/0046734 | A1 | 2/2009 | Cheriton et al. |
| 2009/0067348 | A1 | 3/2009 | Vasseur et al. |
| 2010/0049860 | A1 * | 2/2010 | Kouvelas et al. ............. 709/230 |
| 2011/0051651 | A1 * | 3/2011 | Wu ........................ H04L 12/185 370/312 |

OTHER PUBLICATIONS

Gnawali et al., "The Minimum Rank Objective Function with Hysteresis", <draft-ietf-roll-minrank-hysteresis-of-4>, IETF, May 17, 2011, 11 pages.
Hui et al., "Multicast Forwarding Using Using Trickle", <draft-ietf-roll-trickle-mcast-00, IETF, Apr. 11, 2011, 31 pages.
Thubert, "RPL Objective Function 0" <draft-ietf-roll-of0-15>, IETF, Jul. 8, 2011, 14 pages.
Vasseur et al., "Routing Metrics used for Path Calculation in Low Power and Lossy Networks" <draft-ietf-roll-routing-metrics-19>, IETF, Mar. 1, 2011, 31 pages.
Winter et al., "RPL: IPv6 Routing Protocol for Low Power and Lossy Networks" <draft-ietf-roll-rpl-19>, IETF, Mar. 13, 2011, 164 pages.

* cited by examiner

*Primary Examiner* — John Pezzlo
(74) *Attorney, Agent, or Firm* — Parker Ibrahim & Berg LLC; James M. Behmke; Stephen D. LeBarron

(57) ABSTRACT

In one embodiment, a network device selectively operates according to a sparse multicast mode where the network device stores individual devices interested in one or more multicast groups and distributes corresponding multicast group traffic based on the individual devices. Alternatively, the network device selectively operates according to a dense multicast mode where the network device maintains a list of the one or more multicast groups in which at least one device is interested and distributes corresponding multicast group traffic through broadcasting. By determining one or more resource-related characteristics, the network device may then select between operation in the sparse multicast mode and the dense multicast mode based on the resource-related characteristics.

22 Claims, 17 Drawing Sheets

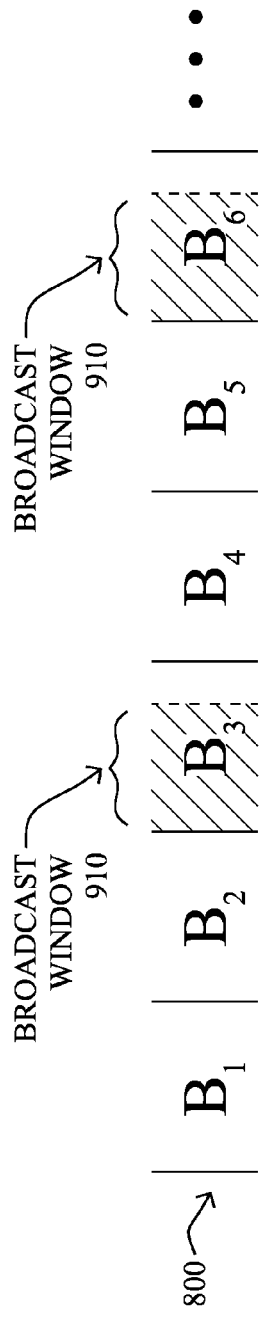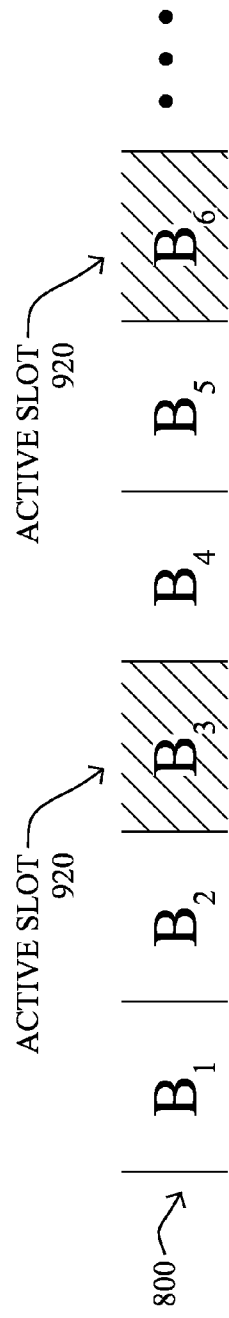
FIG. 9A
FIG. 9B

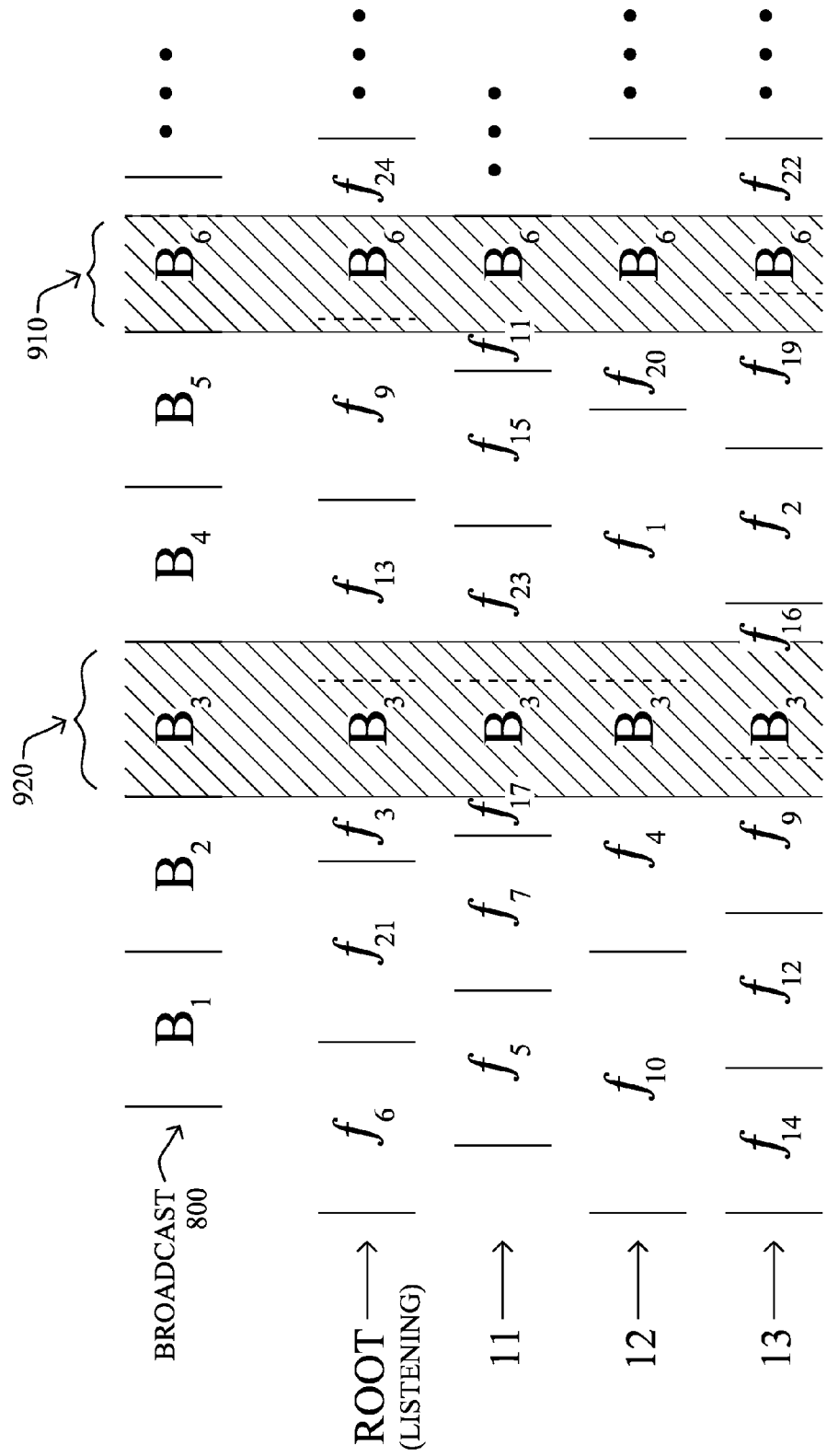

DYNAMIC MULTICAST MODE SELECTION IN A COMMUNICATION NETWORK

TECHNICAL FIELD

The present disclosure relates generally to communication networks, and, more particularly, to multicast communication.

BACKGROUND

Low power and Lossy Networks (LLNs), e.g., sensor networks, have a myriad of applications, such as Smart Grid and Smart Cities. Such applications typically utilize multicast communication for delivering messages to multiple devices within the LLN. Multicast communication is often used for configuring, upgrading the firmware, and issuing requests to groups of devices (as opposed to all devices, thus the critical need for multicast in addition to broadcast).

One method to support multicast delivery in an LLN is by implementing a network-wide flood. With this method, a device receiving new multicast messages forwards the messages simply by rebroadcasting the same messages. A unique identifier (e.g., sequence number) within the message allows devices to determine if they have is previously received the message and, if so, the device simply ignores repeated receptions. While simple, this mechanism introduces significant transmission overhead since every device in the LLN will rebroadcast a multicast message. Such a technique is in fact similar to data packet broadcast, an expensive technique in LLNs.

An alternative approach is to use the known Trickle algorithm to disseminate the multicast message to all devices in a controlled fashion. While the Trickle algorithm minimizes transmission overhead, the suppression mechanisms can add significant communication delay.

Yet another approach is to build and maintain a multicast forwarding topology. For example, routers can maintain states about which of its descendants (e.g., in a directed acyclic graph or "DAG") are subscribed to a multicast group. When receiving a multicast message in this approach, a router will unicast the message to each child that has indicated interest in the multicast group. This mechanism is efficient when the group membership is sparse, but very inefficient when the group membership is dense (e.g., all-nodes group). A Smart Grid advanced metering infrastructure (AMI) deployment can be quite dense, and a router may have many (e.g., greater than one hundred) children. Sending a unicast message to each child on each hop is thus very inefficient.

BRIEF DESCRIPTION OF THE DRAWINGS

The embodiments herein may be better understood by referring to the following description in conjunction with the accompanying drawings in which like reference numerals indicate identically or functionally similar elements, of which:

FIGS. 9A-9B illustrate example frequency-hopping sequence arrangements with broadcast slots;

FIG. 10 illustrates an example frequency-hopping sequence arrangement with broadcast slots;

DESCRIPTION OF EXAMPLE EMBODIMENTS

Overview

Figure 1:
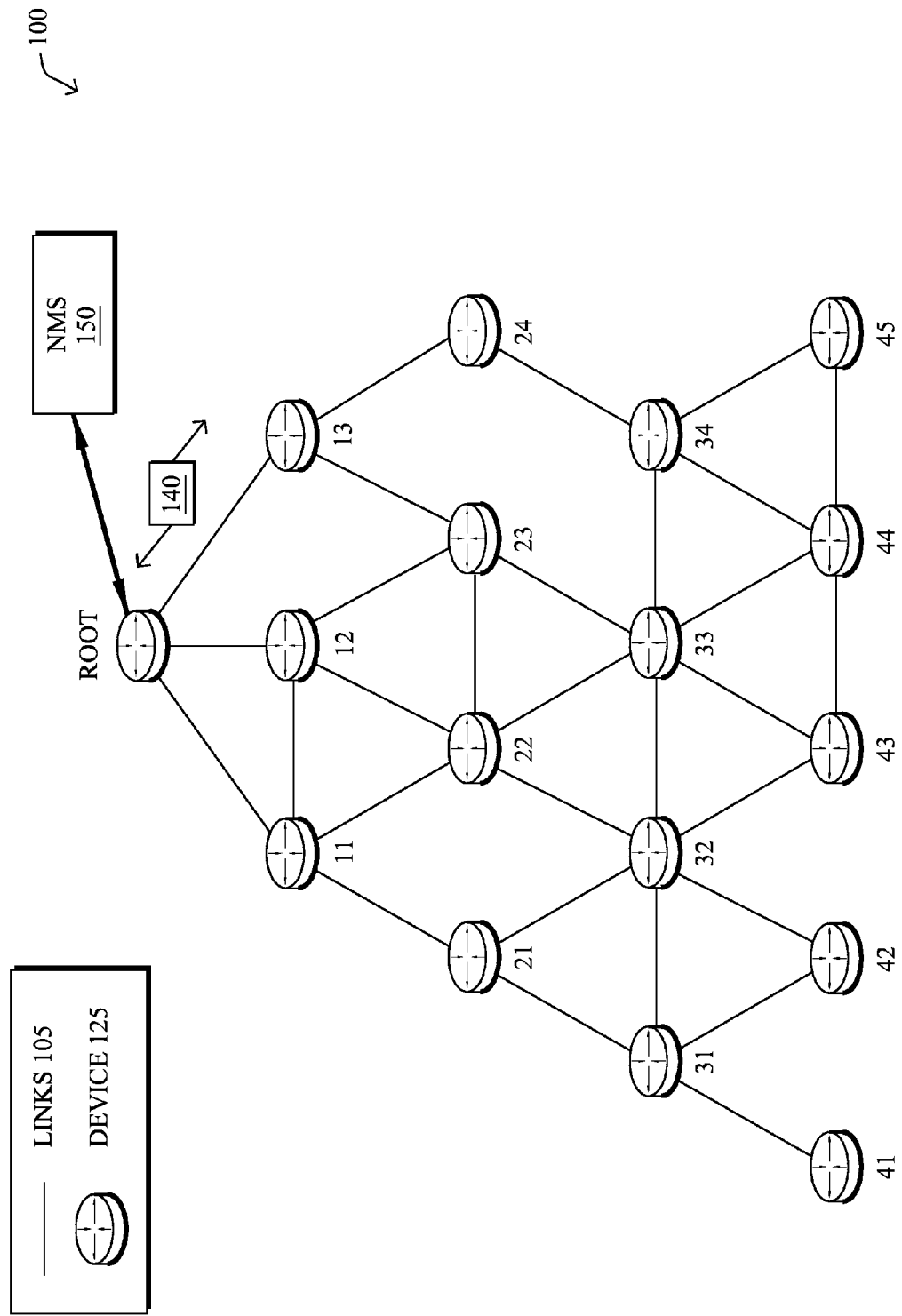
FIG. 1 illustrates an example communication network.

According to one or more embodiments of the disclosure, a network device selectively operates according to a sparse multicast mode where the network device stores individual devices interested in one or more multicast groups and distributes corresponding multicast group traffic based on the individual devices. Alternatively, the network device selectively operates according to a dense multicast mode where the network device maintains a list of the one or more multicast groups in which at least one device is interested and distributes corresponding multicast group traffic through broadcasting. By determining one or more resource-related characteristics, the network device may then select between operation in the sparse multicast mode and the dense multicast mode based on the resource-related characteristics.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC) such as IEEE 61334, IEEE P1901.2, and others.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), etc. Generally, size and cost constraints on smart object nodes (e.g., sensors) result in corresponding constraints on resources such as energy, memory, computational speed and bandwidth. Correspondingly, a reactive routing protocol may, though need not, be used in place of a proactive routing protocol for smart object networks.

FIG. 1 is a schematic block diagram of an example computer network 100 illustratively comprising nodes/devices 200 (e.g., labeled as shown, "root," "11," "12," . . . "45," and described in FIG. 2 below) interconnected by various methods of communication. For instance, the links 105 may be wired links or shared media (e.g., wireless links, PLC links, etc.) where certain nodes 200, such as, e.g., routers, sensors, computers, etc., may be in communication with other nodes 200, e.g., based on distance, signal strength, current operational status, location, etc. Those skilled in the art will understand that any number of nodes, devices, links, etc. may be used in the computer network, and that the view shown herein is for simplicity. Also, those skilled in the art will further understand that while the network is shown in a certain orientation, particularly with a "root" node, the network 100 is merely an example illustration that is not meant to limit the disclosure.

Data packets 140 (e.g., traffic and/or messages sent between the devices/nodes) may be exchanged among the nodes/devices of the computer network 100 using predefined network communication protocols such as certain known wired protocols, wireless protocols (e.g., IEEE Std. 802.15.4, WiFi, Bluetooth®, etc.), PLC protocols, or other shared-media protocols where appropriate. As described herein, the communication may be based on a frequency-hopping protocol. In this context, a protocol consists of a set of rules defining how the nodes interact with each other.

Figure 2:
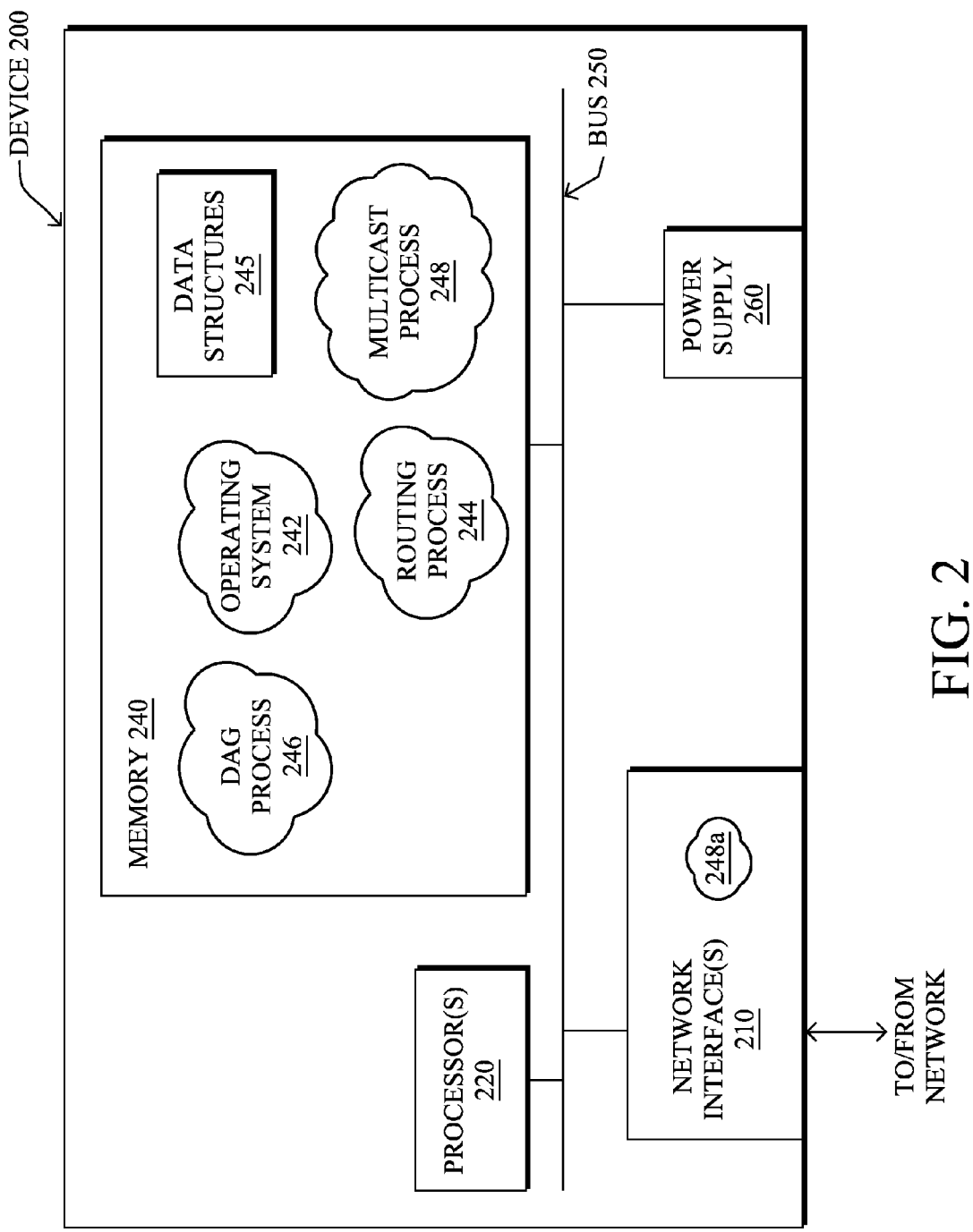
FIG. 2 illustrates an example network device/node.

FIG. 2 is a schematic block diagram of an example node/device 200 that may be used with one or more embodiments described herein, e.g., as any of the nodes shown in FIG. 1 above. The device may comprise one or more network interfaces 210 (e.g., wired, wireless, PLC, etc.), at least one processor 220, and a memory 240 interconnected by a system bus 250, as well as a power supply 260 (e.g., battery, plug-in, etc.).

The network interface(s) 210, e.g., transceivers, contain the mechanical, electrical, and signaling circuitry for communicating data over wireless links 105 coupled to the network 100. The network interfaces may be configured to transmit and/or receive data using a variety of different communication protocols as noted above and as will be understood by those skilled in the art, particularly for frequency-hopping communication as described herein. In addition, the interfaces 210 may comprise an illustrative media access control (MAC) layer module 212 (and other layers, such as the physical or "PHY" layer, as will be understood by those skilled in the art). Note, further, that the nodes may have two different types of network connections 210, namely, wireless and wired/physical connections, and that the view herein is merely for illustration. Also, while the network interface 210 is shown separately from power supply 260, for PLC the network interface 210 may communicate through the power supply 260, or may be an integral component of the power supply. In some specific configurations the PLC signal may be coupled to the power line feeding into the power supply.

The memory 240 comprises a plurality of storage locations that are addressable by the processor 220 and the network interfaces 210 for storing software programs and data structures associated with the embodiments described herein. Note that certain devices may have limited memory or no memory (e.g., no memory for storage other than for programs/processes operating on the device and associated caches). The processor 220 may comprise necessary elements or logic adapted to execute the software programs and manipulate the data structures 245. An operating system 242, portions of which are typically resident in memory 240 and executed by the processor, functionally organizes the device by, inter alia, invoking operations in support of software processes and/or services executing on the device. These software processes and/or services may comprise routing process/services 244, a directed acyclic graph (DAG) process 246, and an illustrative multicast process 248, as described herein. Note that while dynamic multicast process 248 is shown in centralized memory 240, alternative embodiments provide for the process to be specifically operated within the network interfaces 210, such as process "248a".

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Routing process (services) 244 contains computer executable instructions executed by the processor 220 to perform functions provided by one or more routing protocols, such as proactive or reactive routing protocols as will be understood by those skilled in the art. These functions may, on capable devices, be configured to manage a routing/forwarding table (a data structure 245) containing, e.g., data used to make routing/forwarding decisions. In particular, in proactive routing, connectivity is discovered and known prior to computing routes to any destination in the network, e.g., link state routing such as Open Shortest Path First (OSPF), or Intermediate-System-to-Intermediate-System (ISIS), or Optimized Link State Routing (OLSR). Reactive routing, on the other hand, discovers neighbors (i.e., does not have an a priori knowledge of network topology), and in response to a needed route to a destination, sends a route request into the network to determine which neighboring node may be used to reach the desired destination. Example reactive routing protocols may comprise Ad-hoc On-demand Distance Vector (AODV), Dynamic Source Routing (DSR), DYnamic MANET On-demand Routing (DYMO), etc. Notably, on devices not capable or configured to store routing entries, routing process 244 may consist solely of providing mechanisms necessary for source routing techniques. That is, for source routing, other devices in the network can tell the less capable devices exactly where to send the packets, and the less is capable devices simply forward the packets as directed.

Low power and Lossy Networks (LLNs), e.g., certain sensor networks, may be used in a myriad of applications such as for "Smart Grid" and "Smart Cities." A number of challenges in LLNs have been presented, such as:

1) Links are generally lossy, such that a Packet Delivery Rate/Ratio (PDR) can dramatically vary due to various sources of interferences, e.g., considerably affecting the bit error rate (BER);

2) Links are generally low bandwidth, such that control plane traffic must generally be bounded and negligible compared to the low rate data traffic;

3) There are a number of use cases that require specifying a set of link and node metrics, some of them being dynamic, thus requiring specific smoothing functions to avoid routing instability, considerably draining bandwidth and energy;

4) Constraint-routing may be required by some applications, e.g., to establish routing paths that will avoid non-encrypted links, nodes running low on energy, etc.;

5) Scale of the networks may become very large, e.g., on the order of several thousands to millions of nodes; and 6) Nodes may be constrained with a low memory, a reduced processing capability, a low power supply (e.g., battery).

In other words, LLNs are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point to a subset of devices inside the LLN) and multipoint-to-point traffic (from devices inside the LLN towards a central control point).

An example protocol specified in an Internet Engineering Task Force (IETF) Internet Draft, entitled "RPL: IPv6 Routing Protocol for Low Power and Lossy is Networks" <draft-ietf-roll-rpl-19> by Winter, et al. (Mar. 13, 2011 version), provides a mechanism that supports multipoint-to-point (MP2P) traffic from devices inside the LLN towards a central control point (e.g., LLN Border Routers (LBRs) or "root nodes/devices" generally), as well as point-to-multipoint (P2MP) traffic from the central control point to the devices inside the LLN (and also point-to-point, or "P2P" traffic). RPL (pronounced "ripple") may generally be described as a distance vector routing protocol that builds a Directed Acyclic Graph (DAG) for use in routing traffic/packets 140, in addition to defining a set of features to bound the control traffic, support repair, etc. Notably, as may be appreciated by those skilled in the art, RPL also supports the concept of Multi-Topology-Routing (MTR), whereby multiple DAGs can be built to carry traffic according to individual requirements.

A DAG is a directed graph having the property that all edges (and/or vertices) are oriented in such a way that no cycles (loops) are supposed to exist. All edges are contained in paths oriented toward and terminating at one or more root nodes (e.g., "clusterheads or "sinks"), often to interconnect the devices of the DAG with a larger infrastructure, such as the Internet, a wide area network, or other domain. In addition, a Destination Oriented DAG (DODAG) is a DAG rooted at a single destination, i.e., at a single DAG root with no outgoing edges. A "parent" of a particular node within a DAG is an immediate successor of the particular node on a path towards the DAG root, such that the parent has a lower "rank" than the particular node itself, where the rank of a node identifies the node's position with respect to a DAG root (e.g., the farther away a node is from a root, the higher is the rank of that node). Further, in certain embodiments, a sibling of a node within a DAG may be defined as any neighboring node which is located at the same rank within a DAG. Note that siblings do not necessarily share a common parent, and routes between siblings are generally not part of a DAG since there is no forward progress (their rank is the same). Note also that a tree is a kind of DAG, where each device/node in the DAG generally has one parent or one preferred parent.

DAGs may generally be built (e.g., by DAG process 246) based on an Objective Function (OF). The role of the Objective Function is generally to specify rules on how to build the DAG (e.g. number of parents, backup parents, etc.).

In addition, one or more metrics/constraints may be advertised by the routing protocol to optimize the DAG against. Also, the routing protocol allows for including an optional set of constraints to compute a constrained path, such as if a link or a node does not satisfy a required constraint, it is "pruned" from the candidate list when computing the best path. (Alternatively, the constraints and metrics may be separated from the OF.) Additionally, the routing protocol may include a "goal" that defines a host or set of hosts, such as a host serving as a data collection point, or a gateway providing connectivity to an external infrastructure, where a DAG's primary objective is to have the devices within the DAG be able to reach the goal. In the case where a node is unable to comply with an objective function or does not understand or support the advertised metric, it may be configured to join a DAG as a leaf node. As used herein, the various metrics, constraints, policies, etc., are considered "DAG parameters."

Illustratively, example metrics used to select paths (e.g., preferred parents) may comprise cost, delay, latency, bandwidth, expected transmission count (ETX), etc., while example constraints that may be placed on the route selection may comprise various reliability thresholds, restrictions on battery operation, multipath diversity, bandwidth requirements, transmission types (e.g., wired, wireless, etc.). The OF may provide rules defining the load balancing requirements, such as a number of selected parents (e.g., single parent trees or multi-parent DAGs). Notably, an example for how routing metrics and constraints may be obtained may be found in an IETF Internet Draft, entitled "Routing Metrics used for Path Calculation in Low Power and Lossy Networks" <draft-ietf-roll-routing-metrics-19> by Vasseur, et al. (Mar. 1, 2011 version). Further, an example OF (e.g., a default OF) may be found in an IETF Internet Draft, entitled "RPL Objective Function 0" <draft-ietf-roll-of0-15> by Thubert (Jul. 8, 2011 version) and "The Minimum Rank Objective Function with Hysteresis" <draft-ietf-roll-minrank-hysteresis-of-04> by O. Gnawali et al. (May 17, 2011 version).

Building a DAG may utilize a discovery mechanism to build a logical representation of the network, and route dissemination to establish state within the is network so that routers know how to forward packets toward their ultimate destination. Note that a "router" refers to a device that can forward as well as generate traffic, while a "host" refers to a device that can generate but does not forward traffic. Also, a "leaf" may be used to generally describe a non-router that is connected to a DAG by one or more routers, but cannot itself forward traffic received on the DAG to another router on the DAG. Control messages may be transmitted among the devices within the network for discovery and route dissemination when building a DAG.

According to the illustrative RPL protocol, a DODAG Information Object (DIO) is a type of DAG discovery message that carries information that allows a node to discover a RPL Instance, learn its configuration parameters, select a DODAG parent set, and maintain the upward routing topology. In addition, a Destination Advertisement Object (DAO) is a type of DAG discovery reply message that conveys destination information upwards along the DODAG so that a DODAG root (and other intermediate nodes) can provision downward routes. A DAO message includes prefix information to identify destinations, a capability to record routes in support of source routing, and information to determine the freshness of a particular advertisement. Notably, "upward" or "up" paths are routes that lead in the direction from leaf nodes towards DAG roots, e.g., following the orientation of the edges within the DAG. Conversely, "downward" or "down" paths are routes that lead in the direction from DAG roots towards leaf nodes, e.g., generally going in the opposite direction to the upward messages within the DAG.

Generally, a DAG discovery request (e.g., DIO) message is transmitted from the root device(s) of the DAG downward toward the leaves, informing each successive receiving device how to reach the root device (that is, from where the request is received is generally the direction of the root). Accordingly, a DAG is created in the upward direction toward the root device. The DAG discovery reply (e.g., DAO) may then be returned from the leaves to the root device(s) (unless unnecessary, such as for UP flows only), informing each successive receiving device in the other direction how to reach the leaves for downward routes. Nodes that are capable of maintaining routing state may aggregate routes from DAO messages that they receive before transmitting a DAO message. Nodes that are not capable of maintaining routing state, however, may attach a is next-hop parent address. The DAO message is then sent directly to the DODAG root that can in turn build the topology and locally compute downward routes to all nodes in the DODAG. Such nodes are then reachable using source routing techniques over regions of the DAG that are incapable of storing downward routing state. In addition, RPL also specifies a message called the DIS (DODAG Information Solicitation) message that is sent under specific circumstances so as to discover DAG neighbors and join a DAG or restore connectivity.

Figure 3:
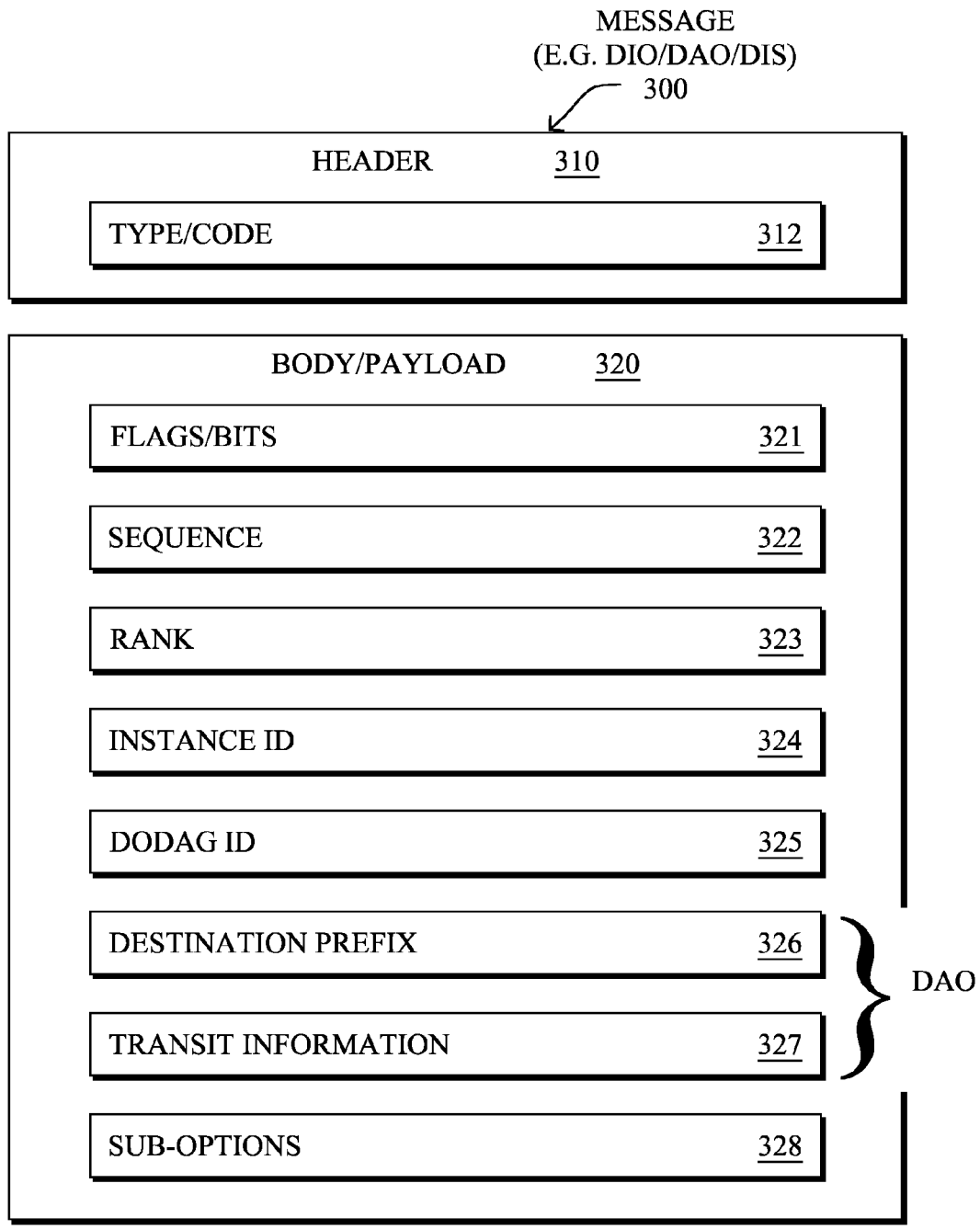
FIG. 3 illustrates an example message format.

FIG. 3 illustrates an example simplified control message format 300 that may be used for discovery and route dissemination when building a DAG, e.g., as a DIO, DAO, or DIS message. Message 300 illustratively comprises a header 310 with one or more fields 312 that identify the type of message (e.g., a RPL control message), and a specific code indicating the specific type of message, e.g., a DIO, DAO, or DIS. Within the body/payload 320 of the message may be a plurality of fields used to relay the pertinent information. In particular, the fields may comprise various flags/bits 321, a sequence number 322, a rank value 323, an instance ID 324, a DODAG ID 325, and other fields, each as may be appreciated in more detail by those skilled in the art. Further, for DAO messages, additional fields for destination prefixes 326 and a transit information field 327 may also be included, among others (e.g., DAO_Sequence used for ACKs, etc.). For any type of message 300, one or more additional sub-option fields 328 may be used to supply additional or custom information within the message 300. For instance, an objective code point (OCP) sub-option field may be used within a DIO to carry codes specifying a particular objective function (OF) to be used for building the associated DAG. Alternatively, sub-option fields 328 may be used to carry other certain information within a message 300, such as indications, requests, capabilities, lists, notifications, etc., as may be described herein, e.g., in one or more type-length-value (TLV) fields.

Figure 4:
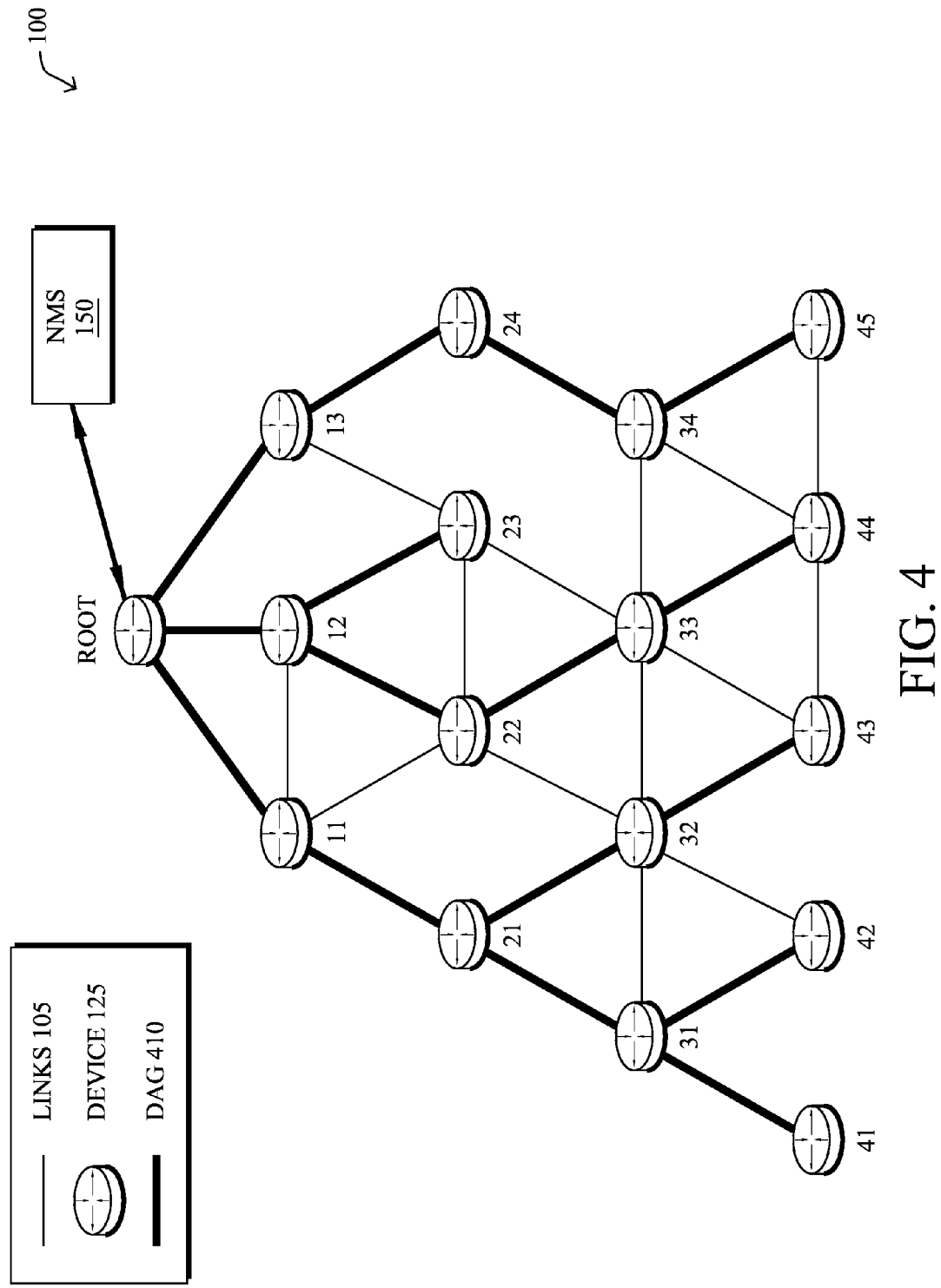
FIG. 4 illustrates an example directed acyclic graph (DAG) in the communication network in FIG. 1.

FIG. 4 illustrates an example simplified DAG that may be created, e.g., through the techniques described above, within network 100 of FIG. 1. For instance, certain links 105 may be selected for each node to communicate with a particular parent (and thus, in the reverse, to communicate with a child, if one exists). These selected links form the DAG 410 (shown as bolded lines), which extends from the root node toward one or more is leaf nodes (nodes without children). Traffic/packets 140 (shown in FIG. 1) may then traverse the DAG 410 in either the upward direction toward the root or downward toward the leaf nodes, particularly as described herein.

Frequency-hopping, also referred to as "frequency-hopping spread spectrum" (FHSS) or channel-hopping, is a method of transmitting radio signals by rapidly switching a carrier among numerous frequency channels, e.g., using a pseudorandom sequence known to both transmitter and receiver. For example, frequency-hopping may be utilized as a multiple access method in the frequency-hopping code division multiple access (FH-CDMA) scheme. Generally, as may be appreciated by those skilled in the art, transmission using frequency-hopping is different from a fixed-frequency transmission in that frequency-hopped transmissions are resistant to interference and are difficult to intercept. Accordingly, frequency-hopping transmission is a useful technique for many applications, such as sensor networks, LLNs, military applications, etc.

Figure 5:
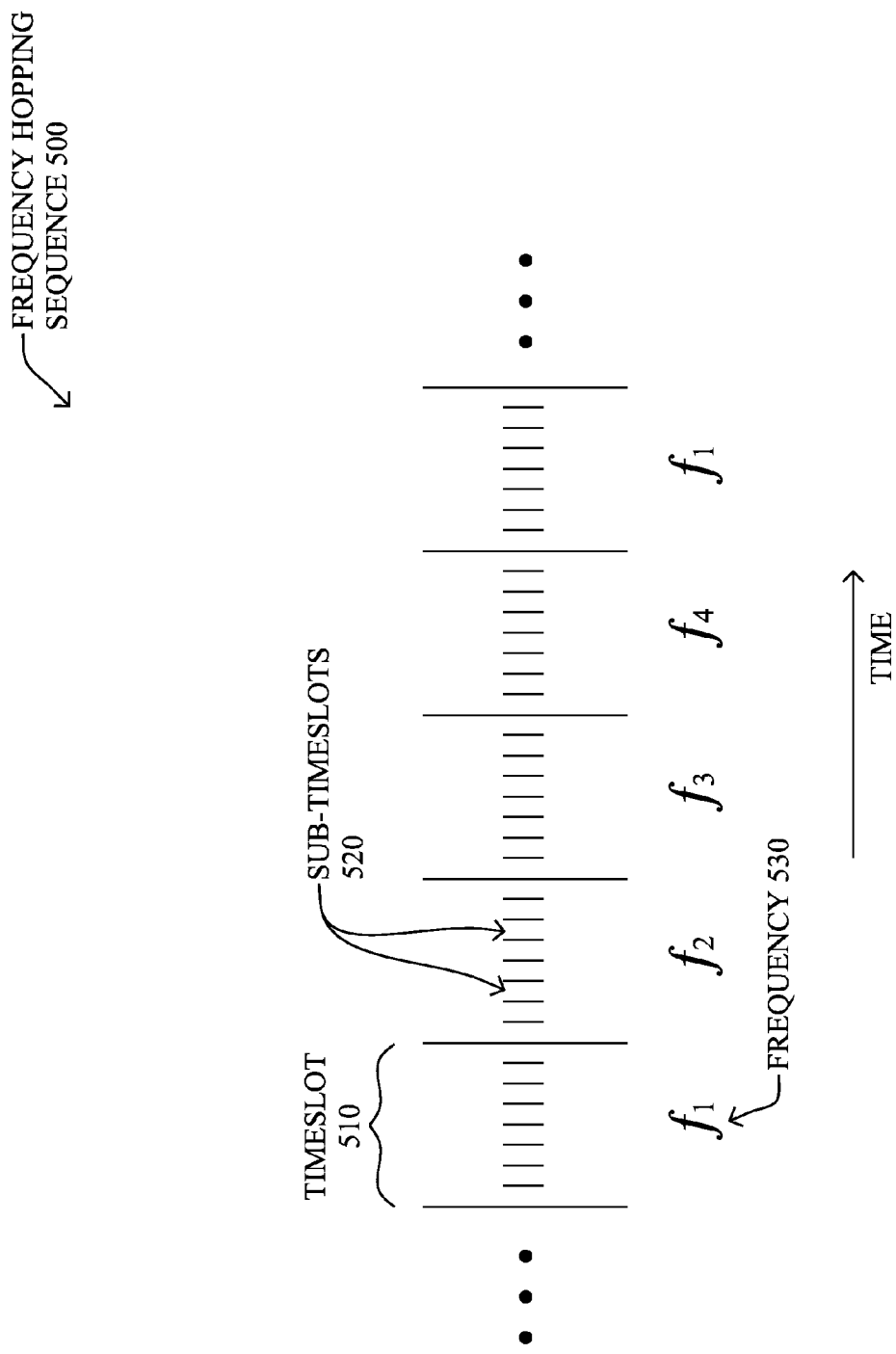
FIG. 5 illustrates an example frequency-hopping sequence.

In general, as shown in FIG. 5, in frequency-hopping wireless networks, time frames are divided within a frequency-hopping sequence 500 into regular timeslots 510, each one operating on a different frequency 530 (e.g., $f_1$-$f_4$). A reference clock may be provided for the time frames for an entire network (e.g., mesh/cell), or at least between pairs of communicating devices. A MAC layer 212 of each node 200 divides time into timeslots that are aligned with the timeslot boundary of its neighbor. Also, each timeslot 510 may be further divided into sub-timeslots 520. (Note that not all frequency-hopping systems use sub-timeslots, and devices can begin transmission at any time within a timeslot; the view herein is merely one example.) Illustratively, the MAC layer 212 is in charge of scheduling the timeslot in which a packet is sent, the main objective of which generally being randomization of the transmission time in order to avoid collisions with neighbors' packets. Note that the MAC layer 212 must not only schedule the data messages coming from upper layers of a protocol stack, but it also must schedule its own packets (e.g., acknowledgements, requests, beacons, etc.).

Figure 6A:
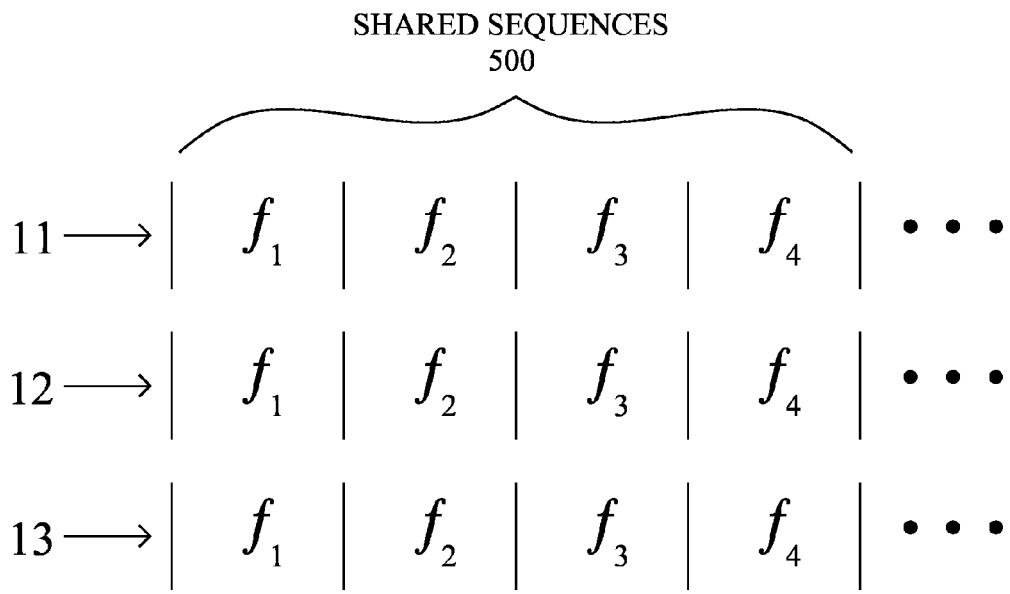
FIGS. 6A-6B illustrate example frequency-hopping sequence arrangements.

A device in the frequency-hopping network configures its receiver to follow a hopping schedule by picking a channel sequence, duration of each time slot, and time is base that defines when the first slot in the schedule begins. To then communicate a packet, the transmitter and receiver must be configured to the same channel during the packet transmission. All devices in a given network may utilize the same hopping schedule (i.e. all devices are configured to use the same channel sequence, time slot duration, and a common time base), resulting in a network where all communication in the network at any given point in time utilizes the same channel. An example of this is shown in FIG. 6A, in which each receiver (e.g., 11, 12, 13, etc.) are all configured with the same sequence (assume also that the root node uses the same sequence).

Figure 6B:
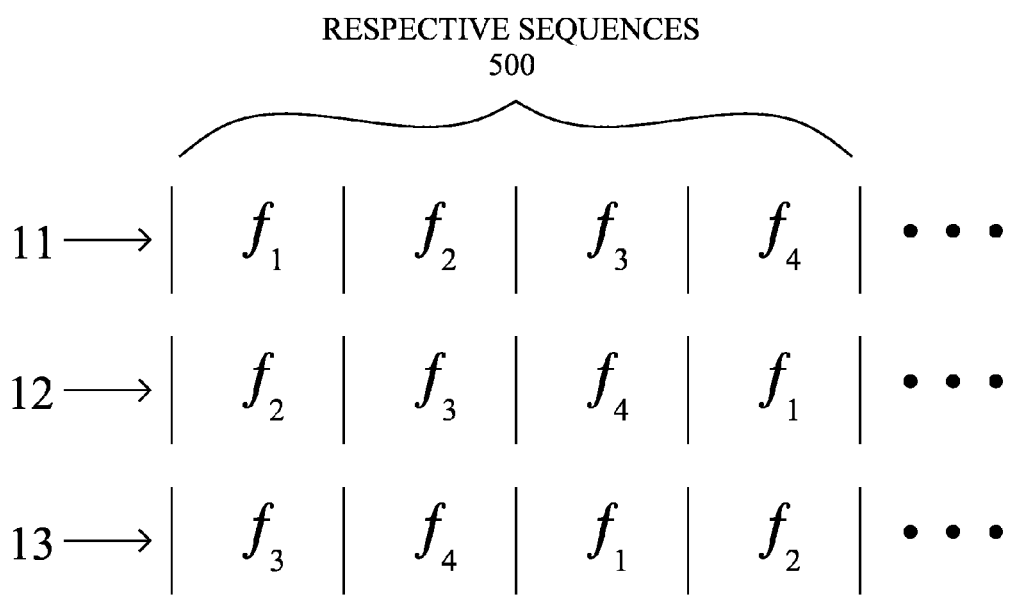

Alternatively, each transmitter-receiver pair may utilize different hopping schedules (i.e., each pair may differ in channel sequence, time slot duration, and/or time base), such that transmitter-receiver pairs may communicate at the same time but on different channels. For instance, each device in the channel hopping network may individually pick their own hopping schedule parameters independent of any other node, as is shown in FIG. 6B. Note that the offset of the frequencies (i.e., the fact that the same four frequencies are used in the same order, just offset by one timeslot) is merely one illustration, and the sequences and frequencies can be independently chosen. Also, note that while timeslots are shown as being synchronized between different nodes, those skilled in the art will appreciate that timeslots between different nodes can, in fact, be out-of-phase, and may have no relationship with each other.

A device synchronizes its hopping schedule with another device by communicating its channel sequence, time slot duration, and current time within the hopping schedule. Hopping schedule parameters may be communicated in explicit synchronization packets and/or piggybacked on existing data packets. As mentioned, some of these parameters (e.g., channel sequence) may be network-wide and implicit. Devices store these parameters to know what channel to use for transmission at a particular time.

As noted above, frequency/channel schedules may be assigned to each transmitter-receiver pair independently so that neighboring transmitter-receiver pairs can communicate simultaneously on different channels. Such a strategy increases aggregate network capacity for unicast communication but is inefficient for broadcast communication. Alternatively, all devices in a network may synchronize with a single channel schedule such that all devices transmit and receive on the same channel at any time. Such a strategy increases efficiency for broadcast communication since a single transmission can reach an arbitrary number of neighbors, but decreases aggregate network capacity for unicast communication since neighboring individual transmitter-receiver pairs cannot communicate simultaneously without interfering.

Accordingly, an illustrative enhanced example network configuration may be generally premised on the following factors:

1) Having each device determine its own unicast schedule independent of all other devices,
2) Synchronizing the network to a common broadcast schedule that also indicates when devices listen for broadcast transmissions instead of unicast transmissions,
3) Transmitting unicast messages according to the listening schedules determined by the receiver, and
4) Transmitting broadcast messages according to the broadcast schedule.

Operationally, each node maintains its own channel-hopping schedule for receiving unicast messages, thus independently determining a "local unicast listening schedule" for each device. A unicast schedule is defined by the following parameters:

1) Channel Sequence: a list of channels, e.g., indexed by a 16-bit integer, that a mesh interface follows when listening for unicast transmissions. Each entry in the Channel Sequence may be determined by a function that is based on a unique identifier of the device, e.g., the interface's MAC address, and the list index. Using the MAC address helps ensure that neighboring nodes do not follow the same pseudo-random sequence and reduces the chance of repeated collisions by neighboring transmitter-receiver pairs.
2) Slot Duration: the unicast schedule divides time into equal sized slots. A node listens to a single channel for the entire duration of a slot. At the beginning of each slot, is the node switches to the next channel in the unicast schedule for listening. Note that as mentioned above, each independently determined unicast listening schedule can be independently timed, i.e., the slots (timeslots, sub-timeslots, etc.) need not align between different devices schedules.

Figure 7:
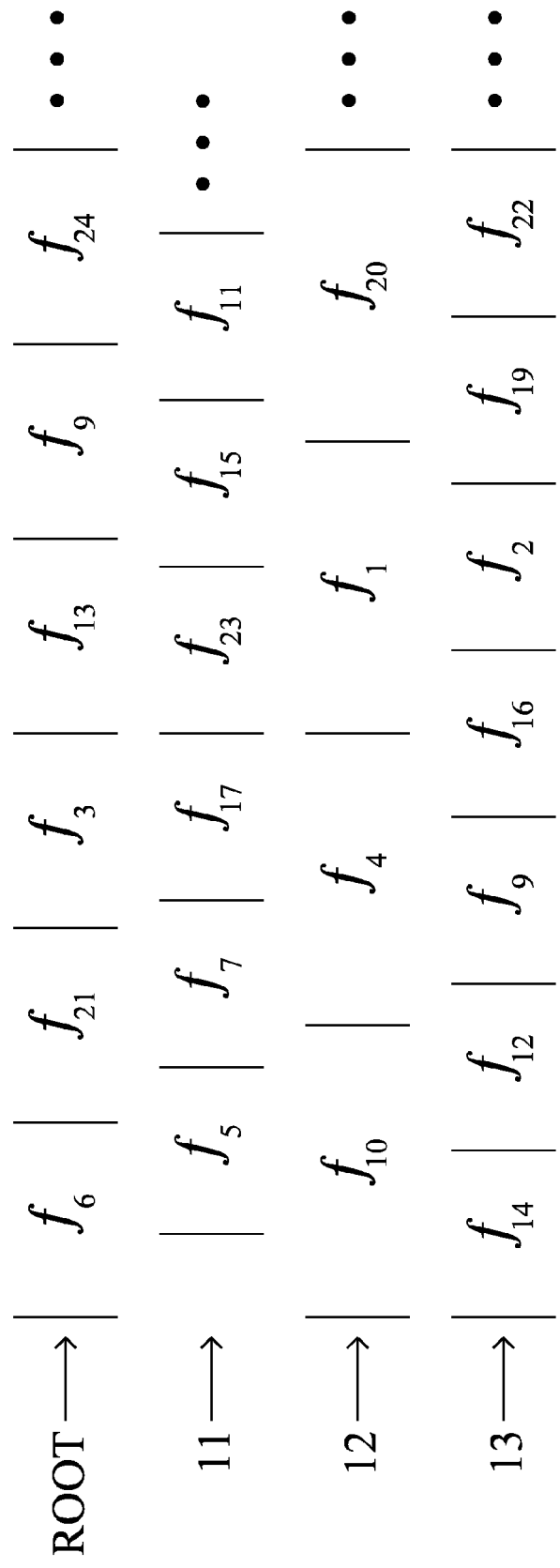
FIG. 7 illustrates another example frequency-hopping sequence arrangement.

FIG. 7 illustrates another example of independently determined local unicast listening schedules 500 that may be computed by each individual device in the network 100. Note how there is generally no overlap at any given time (a goal of the scheduling algorithm, but not a necessity), and that certain frequencies may be re-used at different times. Note also that contrary to FIG. 6B, the schedules are completely independent, that is, they are not simply an offset of the same order, and the slots do not generally line up between the devices.

A transmitter must learn and synchronize with a receiver's channel-hopping schedule to successfully transmit unicast messages to it. Accordingly, each device may share their local unicast listening schedule with its neighbors, such that each device can correspondingly discovering a neighbor unicast listening schedule for each neighbor, accordingly. As mentioned above, a node includes information about its unicast schedule in various link frames (packets 140) to allow neighboring nodes to synchronize to its unicast schedule. The information may generally include the phase information, i.e., the amount of time that has elapsed between a "Start-of-Frame" transmission and the start of the current unicast timeslot, and slot information, i.e., the slot number during which the Start-of-Frame was transmitted.

Having each receiver maintain its own channel-hopping schedule increases overall throughput of the network since different transmitter-receiver pairs can use multiple channels simultaneously. Requiring each transmitter to synchronize with each receiver independently increases overall robustness, since any synchronization errors will be localized to the affected transmitter-receiver pair.

According to the illustrative example, in addition to the unicast listening schedules, all nodes in the same network may synchronize to a common broadcast is schedule that simultaneously overlays a configured portion of all unicast listening schedules in the network. Note that there is generally no coordination of broadcast schedules between different networks. A broadcast schedule is defined by the following parameters:

1) Channel Sequence: a list of channels, e.g., indexed by a 16-bit integer, that a mesh interface follows when listening for broadcast transmissions. Each entry in the Channel Sequence may be determined by a function that takes a unique identifier of the network (e.g., an IEEE 802.15.4 personal area network or "PAN" ID) and the list index. Using the network ID helps ensure that neighboring networks (e.g., PANs) do not follow the same pseudo-random sequence and reduces the chance of repeated collisions by neighboring networks.
2) Slot Duration: the broadcast schedule divides time into equal sized slots. At the beginning of each slot, the node switches to the next channel in the broadcast schedule for listening.

Figure 8:
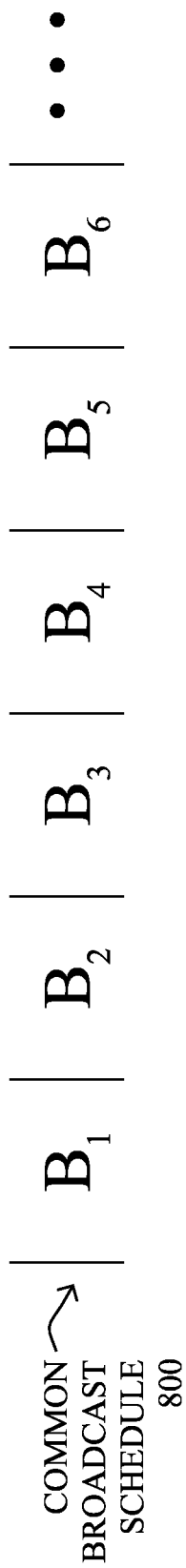
FIG. 8 illustrates an example broadcast frequency-hopping sequence.

FIG. 8 illustrates an example broadcast schedule (sequence) 800, showing example frequencies $B_1$-$B_6$. All nodes in the network synchronize to only one broadcast schedule. The slot timing of broadcast slots in the common broadcast schedule may generally be independent of slot timing of unicast slots in the local unicast listening schedule. Note that while the broadcast schedule 800 is shown with a frequency or channel designated in each timeslot (from which particular portions are selected for use), the techniques herein may also simply populate the schedule with those broadcast slots that are to be used (e.g., only $B_3$ and $B_6$, as shown below). The broadcast schedule may be established by a single root node and distributed to all other nodes using any standard dissemination protocol (e.g., simple flood, Trickle-based dissemination, etc.). Note that the dissemination protocol may utilize unsynchronized transmissions, particularly where no schedule has yet been established. The root node may be administratively assigned (e.g., an IEEE 802.15.4 PAN coordinator, Field Area Router, etc.) or automatically discovered (e.g., a smallest IEEE 802.15.4 IEEE EUI-64).

In addition, a broadcast schedule is also defined by the following parameters:

3A) Broadcast Window: specifies how long a node listens for broadcast messages within a broadcast slot. FIG. 9A illustrates an example of broadcast windows 910, during which the common broadcast schedule is to be used (a configured portion overlaying the unicast schedules). Broadcast windows may be found in only specific timeslots as shown, or else may be the initial portion (e.g., one or more sub-timeslots) of every timeslot of the sequence. Broadcast packets must start their transmission within the Broadcast Window to ensure that all neighboring nodes are listening for the broadcast transmission. The Broadcast Window must specify a time that is no greater than the Slot Duration. At the beginning of each designated broadcast slot, the node switches to the next channel in the broadcast schedule to listen for broadcast transmissions. At the end of the Broadcast Window, the node returns to listening for unicast transmissions until the start of the next broadcast slot. The unicast schedule is free running and the timing remains unaffected by the broadcast schedule. In other words, the broadcast schedule is overlaid on a node's unicast schedule. Note that in one embodiment, the Broadcast Window may utilize one or more sub-timeslots starting at different offsets within each broadcast slot. For example, the Broadcast Window may start on sub-slot X in slot 1, Y in slot 2, Z in slot 3, etc. The sub-slot start time may be specified as part of the broadcast channel sequence, where each slot indicates not only channel but sub-slot offset.

3B) Active Slot Period (instead of or in addition to a Broadcast Window): specifies which slots within a broadcast schedule are used to listen for broadcast transmissions. For example, an Active Slot Period of 10 would indicate that the node listens for broadcast communication every tenth slot of the broadcast schedule. During the other 9 out of 10 slots, the device follows its own unicast schedule and listens for unicast communication. FIG. 9B illustrates an example of an active slot period 920, e.g., of 3, where every third slot of the common broadcast schedule is a time during which the common broadcast schedule is to be used (e.g., corresponding to $B_3$ and $B_6$).

Notably, the configured portion of the common broadcast schedule that is used to overlap the unicast schedules, e.g., the Broadcast Window size and/or Active Slot Period, can be adjusted to configure the amount of time that a network spends listening for is broadcast traffic rather than unicast traffic.

According to the illustrative example, the common broadcast schedule 800 overlays each individual device's unicast listening schedule 500, such that the devices operate in a receive mode (listening for transmissions) according to the local unicast listening schedule and the common broadcast schedule during the overlaid configured portion, and operate in a transmit mode according to each neighbor unicast listening schedule and the common broadcast schedule during the overlaid configured portion depending upon a destination of transmitted traffic.

For example, FIG. 10 illustrates the overlay of the broadcast schedule 800 over the unicast listening schedules 500 of each device in the network. For instance, as can be seen, the root node listens to its local unicast listening schedule unless the particular overlaid portion of the broadcast schedule dictates that the root listen on the broadcast channel at the time. Should the root node wish to send a transmission to any of its neighbor nodes (11, 12, 13), the root node uses the neighbor's listening schedule according to whether a unicast message or broadcast message is to be used. Note that in FIG. 10, the left side shows an active broadcast slot period 920, while the right side shows a broadcast window 910, though this is merely for illustration. Note further that a combination of slot period 920 and broadcast window 910 may be used, e.g., defining which particular slots of a broadcast schedule to use (period 920), and then further defining a length of time for each of those slots to use (window 910).

In particular, all unicast link frames are thus sent using the receiver's (neighbor's) unicast schedule. The link layer maintains a table for neighboring receivers that includes information about the receivers' schedules. If the intended receiver is not resident in the neighbor table, then the message is passed back to higher layers with an error condition. Otherwise, the transmitter determines the appropriate channel given the current time and begins transmission, i.e., transmitting a unicast message to a particular neighbor during a unicast slot based on the corresponding neighbor unicast listening schedule for the particular neighbor.

Also, all broadcast link frames are thus also sent using the network's broadcast schedule. The link layer maintains information about the broadcast schedule. If the broadcast schedule is unknown, the message is passed back to higher layers with an error condition. Otherwise, the transmitter wait until the next broadcast window, selects the appropriate channel, and begins transmission at that time, i.e., transmitting a broadcast message into the network during a broadcast slot based on the common broadcast schedule.

Separating unicast and broadcast traffic is beneficial in cases where broadcast traffic is used for critical network control or application functions. However, the network may optionally be configured to allow transmission of unicast frames during a broadcast slot while the network is actively listening for broadcast transmissions. Doing so reduces communication delays and aggregate capacity for unicast traffic, but comes at the risk of interfering with broadcast traffic.

A synchronized transmission starts within the intended unicast or broadcast slot but does not need to end within the same slot. That is, a link frame transmission only utilizes a single channel and link frames are not fragmented across different channels. Once a node begins receiving a link frame, it will continue receiving the frame until the end of transmission.

Note further that synchronized transmissions should take into account any of the uncertainties in time synchronization. Such uncertainties may be due to frequency tolerances of nodes' clock sources and interrupt processing jitter when time stamping events. To account for these uncertainties, nodes do not begin transmissions near the start or end of a unicast slot or a broadcast listen window. Instead, nodes may schedule their transmissions outside of such guard windows.

Additionally, unicast transmissions typically request an acknowledgment. Acknowledgment frames may thus be sent using the same channel as the received frame being acknowledged. Utilizing the same channel for sending the acknowledgment removes the channel switch overhead on both the transmitter and receiver. Because acknowledgment frames are transmitted without a clear-channel assessment, the acknowledgment transmission may continue to use the same channel originally acquired by the frame being acknowledged.

Dynamic Multicast Modes

As noted above, LLN applications typically utilize multicast communication for delivering messages to multiple devices within the LLN. Multicast communication is often used for configuring, upgrading the firmware, and issuing requests to groups of devices (as opposed to all devices, thus the critical need for multicast in addition to broadcast).

One method to support multicast delivery in an LLN is by implementing a network-wide flood. With this method, a device receiving new multicast messages forwards the messages simply by rebroadcasting the same messages. A unique identifier (e.g., sequence number) within the message allows devices to determine if they have previously received the message and, if so, the device simply ignores repeated receptions. While simple, this mechanism introduces significant transmission overhead since every device in the LLN will rebroadcast a multicast message. Such a technique is in fact similar to data packet broadcast, an expensive technique in LLNs.

An alternative approach is to use the known Trickle algorithm to disseminate the multicast message to all devices in a controlled fashion. While the Trickle algorithm minimizes transmission overhead, the suppression mechanisms can add significant communication delay.

Yet another approach is to build and maintain a multicast forwarding topology. For example, similar to how a DAG is built, in storing mode RPL routers can maintain states about which of its descendants are subscribed to a multicast group. When receiving a multicast message in this approach, a router will unicast the message to each child that has indicated interest in the multicast group. This mechanism is efficient when the group membership is sparse, but very inefficient when the group membership is dense (e.g., all-nodes group). A Smart Grid AMI deployment can be quite dense, and a router may have many (e.g., greater than one hundred) children. Sending a unicast message to is each child on each hop is thus very inefficient.

The techniques herein, therefore, provide efficient multicast forwarding within communication networks, such as LLNs, which allows efficient propagation for both sparse and dense membership groups within a network. In other words, the techniques herein provide an approach on how to handle multicast packets for both a storing mode (where devices in the network can store multicast routing state) and non-storing mode (where only the DAG root can store multicast routing state). In both storing and non-storing modes, both a sparse and dense mode of operation is also introduced, allowing routers to make tradeoffs in state and communication costs. Nodes storing multicast state dynamically choose between sparse and dense modes, based on various factors, such as, e.g., the nodes' resources, channel capacity, and number of "interested" devices in a multicast group. Finally, the techniques herein may also build multiple topologies and optimize each of them according to the traffic characteristics.

Specifically, according to one or more embodiments of the disclosure as described in detail below, a network device selectively operates according to a sparse multicast mode where the network device stores individual devices interested in one or more multicast groups and distributes corresponding multicast group traffic based on the individual devices. Alternatively, the network device selectively operates according to a dense multicast mode where the network device maintains a list of the one or more multicast groups in which at least one device is interested and distributes corresponding multicast group traffic through broadcasting. By determining one or more resource-related characteristics, the network device may then select between operation in the sparse multicast mode and the dense multicast mode based on the resource-related characteristics.

Illustratively, the techniques described herein may be performed by hardware, software, and/or firmware, such as in accordance with the multicast process 248/248a, which may contain computer executable instructions executed by the processor 220 (or independent processor of interfaces 210) to perform functions relating to the novel techniques described herein, e.g., in conjunction with routing process 244 (and/or DAG is process 246). For example, the techniques herein may be treated as extensions to conventional protocols, such as the various routing and/or communication protocols (e.g., RPL), and as such, may be processed by similar components understood in the art that execute those protocols, accordingly.

Recall that various routing protocols, such as the illustrative RPL protocol, supports both non-storing and storing modes. In non-storing mode, devices do not maintain any DOWNWARD routing state (i.e., routes from the DAG root to individual devices) and source routing from the DAG root is used instead. In storing mode, each DAG router maintains downward routing state and packets are delivered between devices using hop-by-hop forwarding. The techniques herein describe multicast mechanisms for both storing and non-storing modes, but it is important to note that neither is limited to the RPL routing protocol.

In addition, the techniques herein may utilize well-known multicast registration mechanisms or similar multicast techniques. For example, a mechanism similar to existing multicast registration mechanisms, e.g., protocol independent multicast (PIM) and multicast listener discovery (MLD), may be used. In particular, devices may indicate interest in receiving messages destined to a multicast group by sending a subscription message to one or more DAG parents and indicate a timeout. Devices receiving a multicast group subscription message record the group membership with the associated timeout information. If no additional subscription message from the child has been received, the group membership will expire after the specified timeout. A device may also proactively unsubscribe from the group if leaving a multicast group.

Operationally, according to storing mode, multicast forwarding information is maintained within the DAG itself, that is, where intermediate nodes are configured to store individual devices within the DAG. In accordance with the embodiments herein, a router can utilize two modes to maintain multicast states: "sparse" mode and "dense" mode. The router dynamically chooses between the two states to optimize memory and communication costs. Note that in one embodiment, a centralized controller (e.g., root node or NMS) may decide in which multicast mode individual nodes should operate, or is in which mode the entire network should operate. Alternatively, in another embodiment, each individual node may make its own determination of operational mode.

In sparse mode (for storing mode), a router maintains a list multicast addresses for each child. Alternatively, the router could maintain a list of children for each multicast address. The advantage of sparse mode is that it allows the intermediate nodes to target transmissions to individual devices using link-layer unicast transmissions or multicast transmissions. The downside of sparse mode is that state and communication requirements grow proportionally with the number of children subscribing to the same group, as the network devices store individual devices interested in the multicast groups and distribute corresponding multicast group traffic based on the individual devices themselves.

Figure 11:
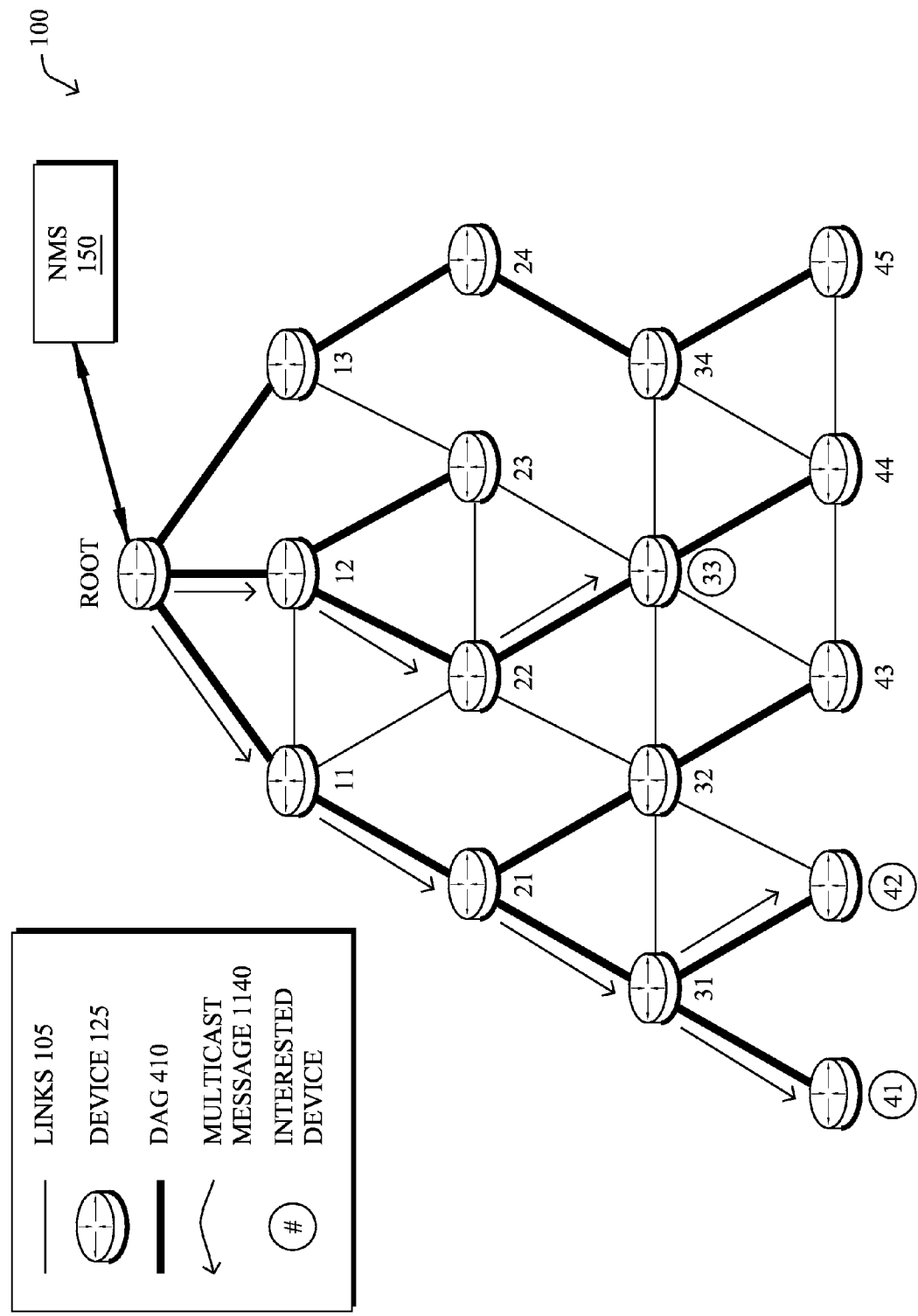
FIG. 11 illustrates an example of sparse mode multicast in a storing mode network.

FIG. 11 illustrates an example of sparse multicast mode when devices are in a storing mode. In particular, as shown, in sparse mode, devices may individually store registered multicast group members, and may forward the multicast traffic 1140 to those individual devices, whether through unicast or multicast transmission, accordingly.

Conversely, in dense multicast mode, a router maintains a list of multicast addresses (groups) that have at least one interested child. Unlike sparse mode, dense mode does not maintain per-child state, reducing state requirements. Because the router does not maintain per-child state, distributing the corresponding multicast group traffic it through broadcasting, e.g., forwarding a multicast frame utilizing link-layer broadcast transmissions, such as broadcast slots 910 or 920. While utilizing broadcast transmissions is efficient since a single transmission can reach an arbitrary number of receivers, the channel capacity allocated to broadcast transmissions may be limited to a small fraction of the overall channel capacity. For example, this tradeoff may be due to the frequency hopping technique described above for the broadcast slots, where the devices may "multicast" the multicast group traffic during a broadcast transmission slot in a frequency hopping sequence during which all devices in the communication network are listening to the same broadcast frequency.

Figure 12:
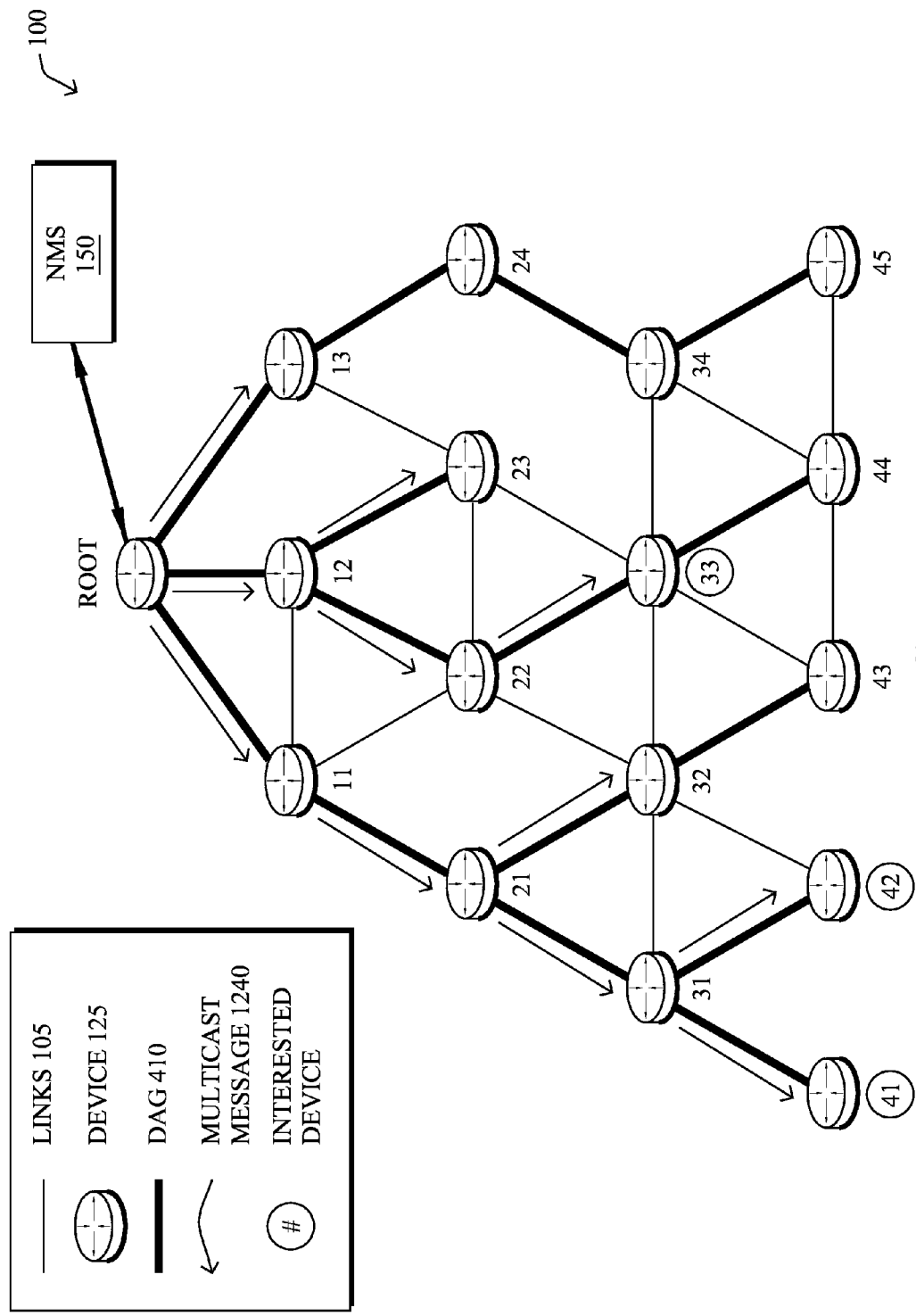
FIG. 12 illustrates an example of dense mode multicast in a storing mode network.

FIG. 12 illustrates an example of dense multicast mode when devices are in a is storing mode. In particular, as shown, each device with at least one interested multicast group member may forward the multicast traffic 1240 during a broadcast transmission slot, accordingly.

Notably, a router chooses whether to operate in sparse or dense mode by evaluating the tradeoff in memory and communication. For instance, the network device (root node, NMS, or individual devices) may determine one or more resource-related characteristics by the network device, in order to thus select between operation in the sparse multicast mode and the dense multicast mode based on the resource-related characteristics. Illustrative resource-related characteristics comprise, e.g., a number of multicast group subscribers, memory constraints, processing capability, channel capacity, communication cost of unicast transmission, communication cost of broadcast transmission, a frequency hopping schedule, etc.

For instance, memory may be based on the memory available to the network device for maintaining multicast state. If memory is very limited, the device may choose to operate in dense mode regardless of the communication cost tradeoff. However, if there are no memory constraints, then the router may choose between sparse and dense modes entirely based on the communication cost tradeoff.

The communication cost tradeoff is illustratively dependent on the kind of link layer in use. If the link-layer does not provide an efficient link-layer multicast mechanism, then operating in sparse mode reduces to sending unicast messages to each subscribed child. In a channel-hopping system, sending repeated unicast messages might be preferable because it utilizes greater spectral diversity and avoids utilizing limited broadcast capacity. Dense mode might be preferred in cases when the cost of repeated unicasts outweighs the benefits. Note that the particular threshold depends on the amount of channel capacity allocated to broadcast communication and the benefits of using unicast communication in the system.

In another embodiment, a router may switch from sparse mode to dense mode at any time without compromising multicast connectivity. However, the router must generally take extra steps in switching from dense mode to sparse mode. In particular, is the router needs to build up the sparse multicast table prior to transitioning into sparse mode when forwarding packets. The router may do this proactively by soliciting children for their subscription messages or waiting for children to renew their multicast registrations.

In yet another embodiment, a router does not need to utilize exclusively sparse or dense mode for all multicast addresses that it maintains. That is, a network device may select between operation in the sparse multicast mode and the dense multicast mode based on the resource-related characteristics per multicast group. In particular, a router may utilize sparse mode for a subset of multicast addresses and dense mode for the remaining multicast addresses. Such choice may be driven by historical traffic observation by the node itself, indication provided by the NMS, etc.

Multicast forwarding in the storing mode flows from the DAG root to each device hop-by-hop. When receiving a multicast message from a DAG parent, the forwarder determines if any children are subscribed to the multicast group. If at least one child is subscribed, then the forwarder will either request a link-layer unicast/multicast or broadcast transmission. When maintaining state in sparse mode, the forwarder will use link-layer unicast/multicast. When maintaining state for dense mode, the forwarder will use link-layer broadcast. Of course, this also applies to any device sending a multicast packet to a group of devices (not just from the DAG root).

Because forwarding occurs using the DAG and devices may have multiple DAG parents, a device may receive the same multicast message multiple times. Any existing mechanism may be used to perform duplicate detection (e.g., sequence number).

In accordance with one or more additional or alternative embodiments herein, the intermediate devices of the network may operate according to a non-storing mode, where only the root device maintains multicast forwarding information. In particular, in non-storing mode, devices continue to register their multicast subscriptions with their parents (i.e., attachment router). However, unlike storing mode, routers receiving multicast subscription messages simply proxy the messages to the DAG root and do not perform any further processing. As a result, the DAG root maintains all state for the multicast groups. The state consists of a list of devices and their parents (attachment routers) for each active multicast address.

In forwarding multicast messages, the DAG root may choose between sparse mode and dense mode. Like the storing mode, the number of subscribers, node resources, channel capacity, etc. influences the choice between sparse and dense modes. However, the forwarding mechanisms between non-storing and storing modes may differ as follows.

In sparse mode, the DAG root forwards multicast messages to each subscriber using unicast communication. For example, in one embodiment the DAG root forwards the multicast messages using source routing. The source routing technique may be used to unicast a copy of the message to each individual subscriber. In another embodiment, the source routing technique may be used to reach the attachment router of one or more subscribers. In this embodiment, the DAG root may encapsulate and tunnel the message to a router using source routing and the router would then unicast/multicast/broadcast the message to its children. That is, source routing is thus used to send an encapsulated message to a particular device as a tunneled unicast message, where decapsulation of the tunneled unicast message at the particular device results in a unicast or multicast message for transmission to individual devices interested in the multicast group traffic.

Figure 13A:
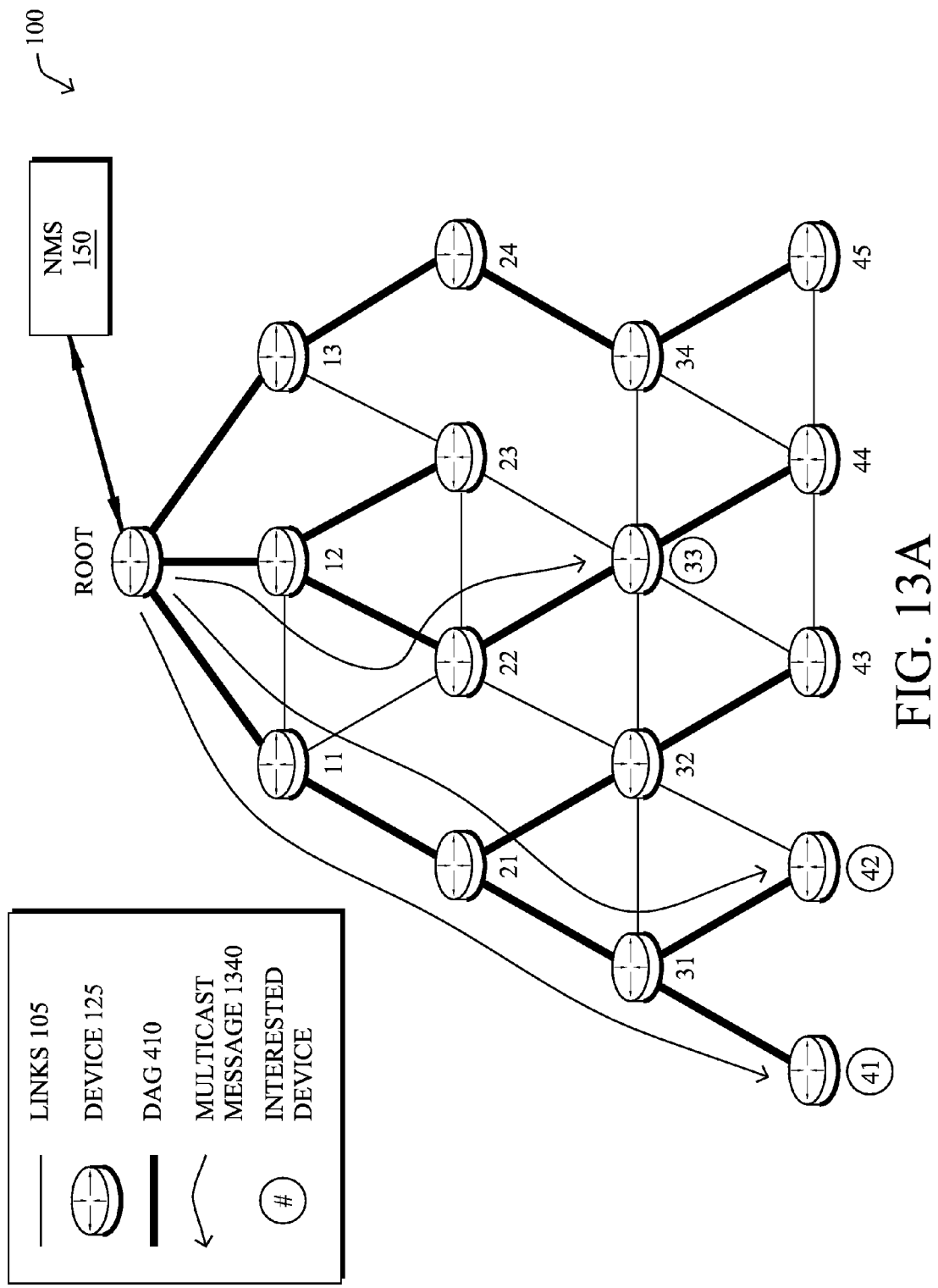
FIGS. 13A-13B illustrate examples of sparse mode multicast in a non-storing mode network.
Figure 13B:
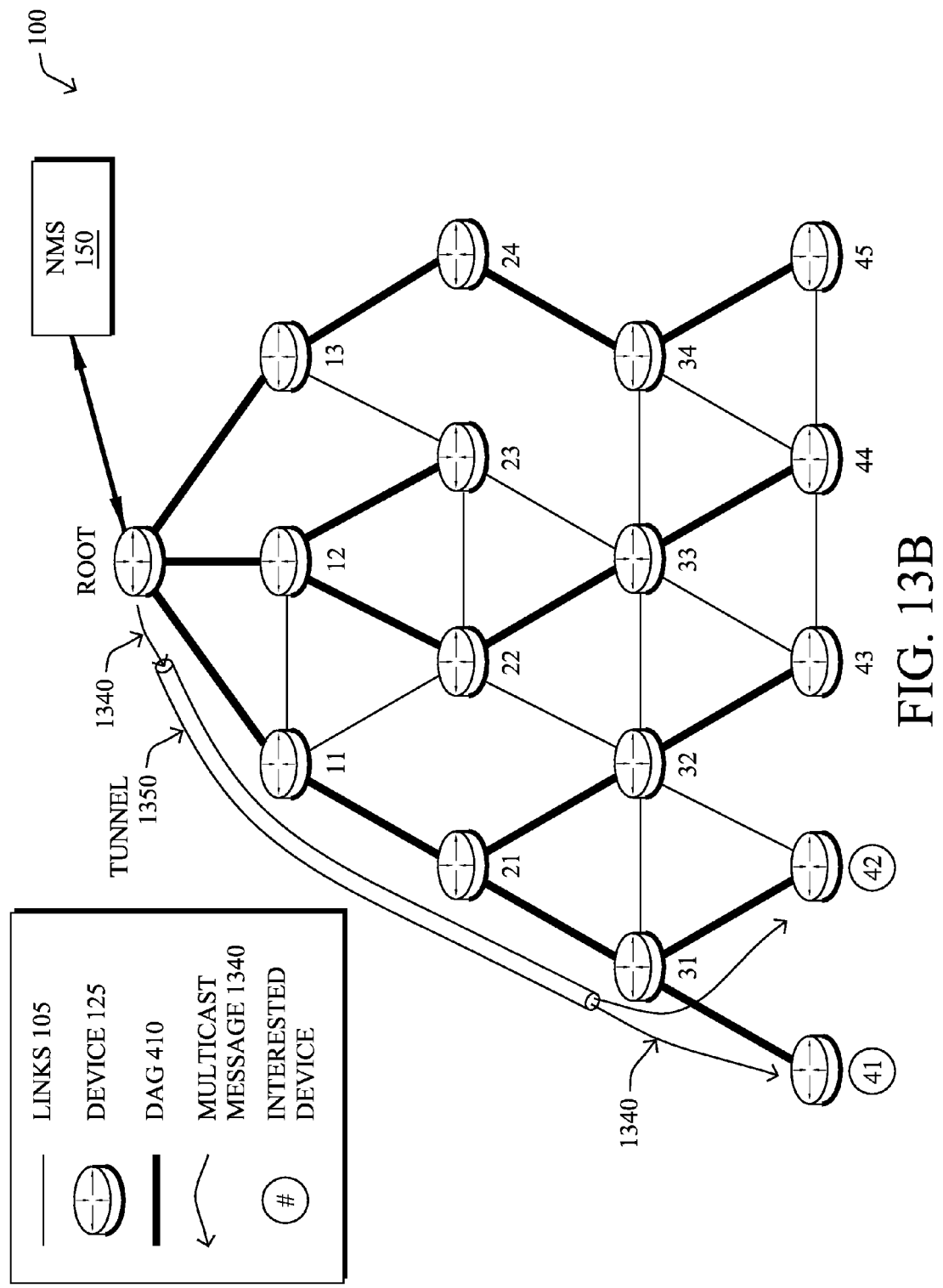

Illustratively, FIG. 13A shows non-storing mode sparse multicast operation, where the root node unicasts each multicast message 1340, using source routing, to the individual devices desiring the traffic, accordingly. Alternatively or in addition, FIG. 13B illustrates non-storing mode sparse multicast operation, where tunneling is used. For instance, assume a tunnel 1350 as shown, such that the multicast message 1340 may be tunneled to an attachment router, and then distributed to members of the multicast group.

Note that because the original packet 1340 is encapsulated, it is not modified in transit. Tunneling is a useful technique in mesh networks because it can be much more efficient that the alternative of flooding. Using tunneling and unicasting a packet close to its destination(s) avoids unnecessarily affecting large numbers of nodes. Note that this contrast in many ways to traditional multicast. Note also that identifying the optimal is tunnel end-point may be performed by analysis (e.g., by the NMS) on the subscribers' distribution.

Figure 14:
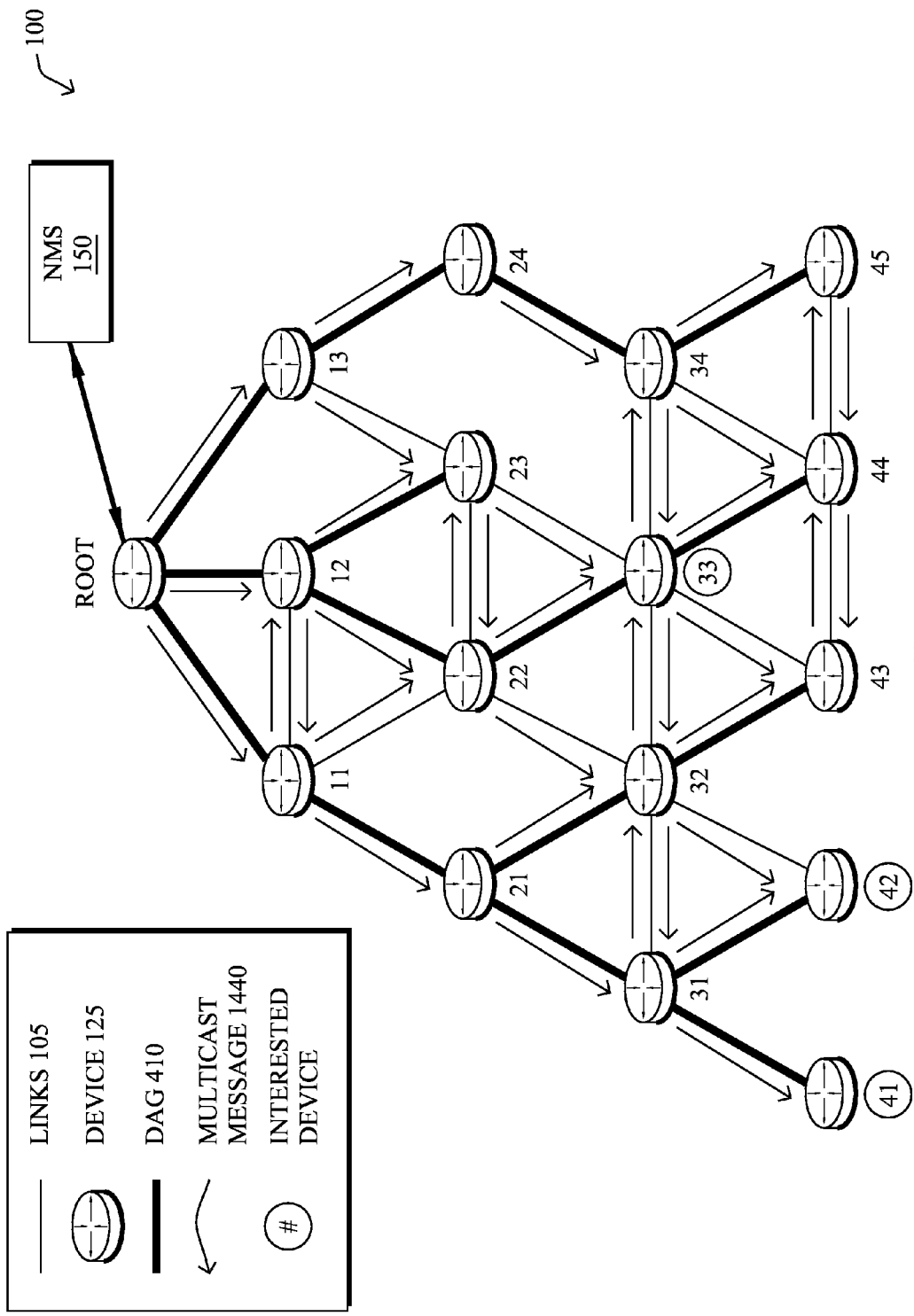
FIG. 14 illustrates an example of dense mode multicast in a non-storing mode network.

Conversely, should a root node in non-storing mode selectively operate in dense mode, the root may then forward multicast messages to each subscriber using a flooding mechanism, i.e., broadcasting multicast group traffic. For example, existing mechanisms may be used, such as that described in the IETF Internet Draft, entitled "Multicast Forwarding Using Trickle" <draft-ietf-roll-trickle-mcast-00> by Hui, et al. (Apr. 11, 2011 version). FIG. 14 illustrates an example of a flooded multicast message 1440, transmitted according to broadcast techniques.

Figure 15:
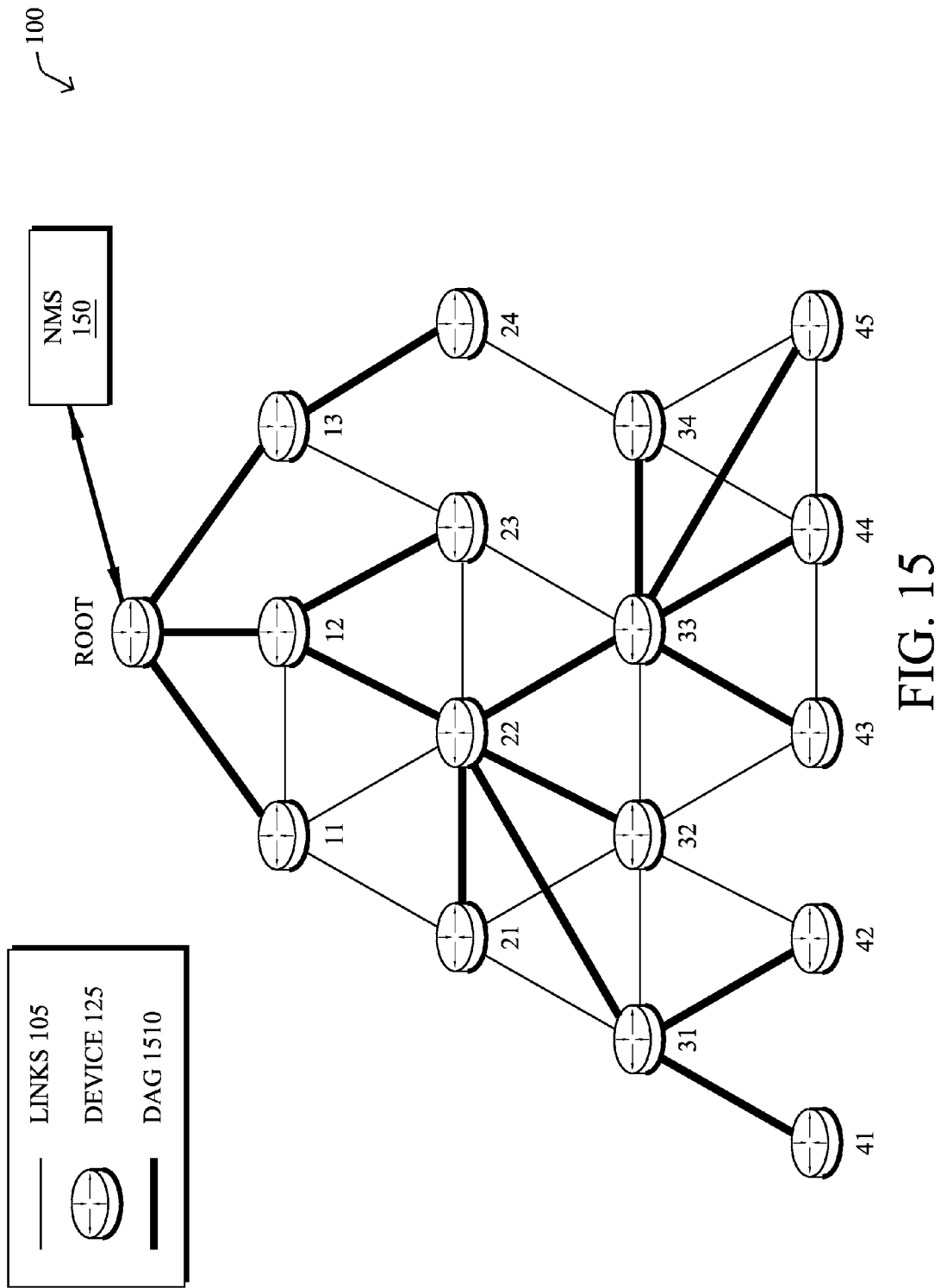
FIG. 15 illustrates an example multicast DAG.

Notably, while the same DAG may be used for unicast and multicast traffic, using only one DAG may not be the best approach. In particular, optimizing a DAG for multicast traffic is often at odds with optimizing the DAG for unicast traffic. For instance, for unicast traffic, it is generally beneficial to balance the load across different devices in the network so that individual devices are not burdened with maintaining state for children and forwarding traffic. In other words, it is beneficial for a device to choose DAG parents that have fewer children. For multicast traffic, however, it is often beneficial to reduce the number of devices needed to forward multicast messages. While building a DAG, this equates to having devices cluster around as few parents as possible. In other words, it is beneficial for a device to choose DAG parents that have more children. Accordingly, in one or more embodiments herein, different DAGs may be utilized for unicast and multicast. In the former case, devices attempt to balance load among their parents by choosing parents that have fewer children. In the latter case, devices attempt to cluster around as few parents as possible. FIG. 15 illustrates an example multicast DAG 1510 that differs from DAG 410 of FIG. 4 above in a manner that may be more suitable for multicast traffic.

Figure 16:
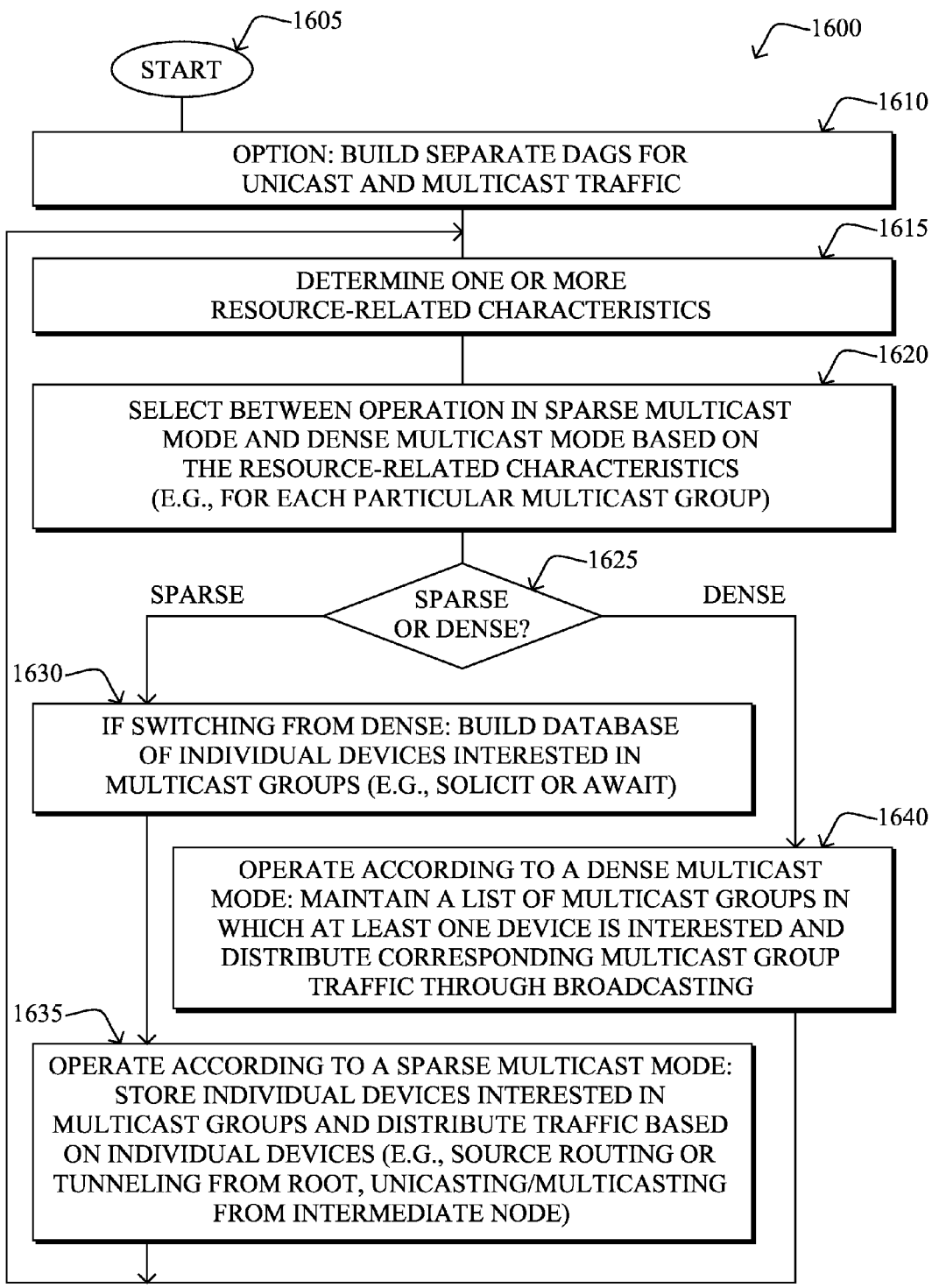
FIG. 16 illustrates an example simplified procedure for dynamic selection of efficient multicast modes communication network.

FIG. 16 illustrates an example simplified procedure for dynamic selection of efficient multicast modes communication network in accordance with one or more embodiments described herein. The procedure 1600 starts at step 1605, and continues to step 1610, where separate DAGs may optionally be built in advance for unicast (e.g., DAG 410) and multicast (e.g., DAG 1510). As described in greater detail above, in step 1615 the device (e.g., a root device or intermediate device) may determine one or more resource-related characteristics in order to select between operation in sparse multicast mode and dense multicast mode in step 1620 based on the resource-related characteristics. Notably, as described above, this selection may be for each particular multicast group, according to one or more embodiments herein.

If the decision is sparse mode in step 1625, then in step 1630, if switching from dense, the device may first be required to (re)build a database of individual devices interested in multicast groups (e.g., soliciting or awaiting registration). Afterward (or if not switching from dense mode), in step 1635, the device may then operate according to a sparse multicast mode: for example, storing individual devices interested in multicast groups and distributing traffic based on individual devices, as described in detail above. For instance, the device as a root device may source route or tunnel the traffic, while an intermediate node may unicast or multicast the traffic, accordingly. Conversely, if in step 1625 the decision is dense mode, then in step 1640, the device may operate according to a dense multicast mode: for example, maintaining a list of multicast groups in which at least one device is interested and distributing corresponding multicast group traffic through broadcasting. The procedure 1600 continues to step 1615 to update various measured resources as shown, or else may return to step 1610 to optionally rebuild any associated DAGs, accordingly.

It should be noted that while certain steps within procedure 1600 may be optional as described above, the steps shown in FIG. 16 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The novel techniques described herein, therefore, provide for dynamic selection of efficient multicast modes communication network. As already pointed out, multicast is a key feature for all networks, including LLNs. In particular, the techniques herein optimize forwarding according to the available network and node resources according to is the density of registered interested devices, thus providing a significantly more optimal network resource utilization of multicast traffic compared to existing techniques, especially in LLNs.

As mentioned above, multicast in mesh networking typically reduces to some form of flooding technique (e.g., simple flooding, Simple Multicast Forwarding, Trickle-based controlled flooding, etc.). In cases where a tree-based topology exists, there are existing methods to flood along the tree rather than a simple flood. The techniques herein differs significantly in its characterization of whether the multicast subscribers are "sparse" or "dense" and dynamically switches between the two modes to determine how best to forward multicast messages both at the network and link layers. This is in great contrast with regular multicast mode of operation, which is ill-suited to LLNs, especially in sparse mode.

While there have been shown and described illustrative embodiments that provide for dynamic selection of efficient multicast modes communication network, it is to be understood that various other adaptations and modifications may be made within the spirit and scope of the embodiments herein. For example, the embodiments have been shown and described herein with relation to LLNs. However, the embodiments in their broader sense are not as limited, and may, in fact, be used with other types of networks and/or protocols. In addition, while certain protocols are shown, such as RPL, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and is modifications as come within the true spirit and scope of the embodiments herein.

What is claimed is:

1. A method, comprising:
   selectively operating a network device according to a sparse multicast mode where the network device stores individual devices interested in one or more multicast groups and distributes corresponding multicast group traffic based on the individual devices;
   selectively operating the network device according to a dense multicast mode where the network device maintains a list of the one or more multicast groups in which at least one device is interested and distributes corresponding multicast group traffic through broadcasting;
   determining one or more resource-related characteristics by the network device;
   selecting between operation in the sparse multicast mode and the dense multicast mode based on the resource-related characteristics; and
   building a database of individual devices interested in one or more multicast groups prior to transitioning from the dense multicast mode to the sparse multicast mode.

2. The method as in claim 1, wherein the resource-related characteristics are selected from a group consisting of: a number of multicast group subscribers; memory constraints; processing capability; channel capacity; communication cost of unicast transmission; communication cost of broadcast transmission; and a frequency hopping schedule.

3. The method as in claim 1, wherein building comprises one of either soliciting the individual devices or awaiting registration from the individual devices.

4. The method as in claim 1, wherein selecting between operation in the sparse multicast mode and the dense multicast mode based on the resource-related characteristics is per multicast group.

5. The method as in claim 1, wherein the network device is a root node of a directed acyclic graph (DAG), the method further comprising:
   source routing multicast group traffic to the individual devices in sparse mode.

6. The method as in claim 5, wherein source routing comprises sending a message to each individual device interested in the multicast group traffic.

7. The method as in claim 5, wherein source routing comprises sending a message to a particular device as a tunneled unicast message, wherein decapsulation of the tunneled unicast message at the particular device results in a multicast message for transmission to one or more of the individual devices interested in the multicast group traffic.

8. The method as in claim 1, wherein the network device is a root node of a directed acyclic graph (DAG), and wherein intermediate nodes of the communication network are configured to operate in a non-storing mode, the method further comprising:
   broadcasting multicast group traffic in dense mode.

9. The method as in claim 1, wherein the network device is an intermediate node configured to operate in a storing mode to store one or more of the individual devices.

10. The method as in claim 9, further comprising:
    distributing multicast group traffic through broadcasting in dense mode by multicasting the multicast group traffic during a broadcast transmission slot in a frequency hopping sequence during which all devices in the communication network are listening to the same broadcast frequency.

11. The method as in claim 1, further comprising:
    distributing multicast group traffic to the individual devices in sparse mode based on the individual devices as one of either one or more unicast messages or one or more multicast messages.

12. The method as in claim 1, further comprising:
    utilizing a first directed acyclic graph (DAG) for unicast transmissions; and
    utilizing a second DAG for multicast transmissions.

13. An apparatus, comprising:
    one or more network interfaces to communicate in a communication network;
    a processor coupled to the network interfaces and adapted to execute one or more processes; and
    a memory configured to store a process executable by the processor, the process when executed operable to:
       selectively operate according to a sparse multicast mode where the process stores individual devices interested in one or more multicast groups and distributes corresponding multicast group traffic based on the individual devices;
       selectively operate according to a dense multicast mode where the process maintains a list of the one or more multicast groups in which at least one device is interested and distributes corresponding multicast group traffic through broadcasting;
       determine one or more resource-related characteristics;
       select between operation in the sparse multicast mode and the dense multicast mode based on the resource-related characteristics; and
       build a database of individual devices interested in one or more multicast groups prior to transitioning from the dense multicast mode to the sparse multicast mode.

14. The apparatus as in claim 13, wherein the resource-related characteristics are selected from a group consisting of: a number of multicast group subscribers; memory constraints; processing capability; channel capacity; communication cost of unicast transmission; communication cost of broadcast transmission; and a frequency hopping schedule.

15. The apparatus as in claim 13, wherein selection between operation in the sparse multicast mode and the dense multicast mode based on the resource-related characteristics is per multicast group.

16. The apparatus as in claim 13, wherein the apparatus is a root node of a directed acyclic graph (DAG), and wherein the process when executed is further operable to:
    source route multicast group traffic to the individual devices in sparse mode.

17. The method as in claim 13, wherein the apparatus is a root node of a directed acyclic graph (DAG), and wherein intermediate nodes of the communication network are configured to operate in a non-storing mode, and wherein the process when executed is further operable to:
    broadcast multicast group traffic in dense mode.

18. The apparatus as in claim 13, wherein the apparatus is an intermediate node configured to operate in a storing mode to store one or more of the individual devices.

19. The apparatus as in claim 18, wherein the process when executed is further operable to:
    distribute multicast group traffic through broadcasting in dense mode by multicasting the multicast group traffic during a broadcast transmission slot in a frequency hopping sequence during which all devices in the communication network are listening to the same broadcast frequency.

20. The apparatus as in claim 13, wherein the process when executed is further operable to:
   distribute multicast group traffic to the individual devices in sparse mode based on the individual devices as one of either one or more unicast messages or one or more multicast messages.

21. The apparatus as in claim 13, wherein the process when executed is further operable to:
   utilize a first directed acyclic graph (DAG) for unicast transmissions; and
   utilize a second DAG for multicast transmissions.

22. A tangible, non-transitory, computer-readable media having software encoded thereon, the software when executed by a processor operable to:
   selectively operate a network device according to a sparse multicast mode to store individual devices interested in one or more multicast groups and distribute corresponding multicast group traffic based on the individual devices;
   selectively operate the network device according to a dense multicast mode to maintain a list of the one or more multicast groups in which at least one device is interested and distribute corresponding multicast group traffic through broadcasting;
   determine one or more resource-related characteristics;
   select between operation in the sparse multicast mode and the dense multicast mode based on the resource-related characteristics; and
   build a database of individual devices interested in one or more multicast groups prior to transitioning from the dense multicast mode to the sparse multicast mode.

\* \* \* \* \*